United States Patent [19]
Frymier

[11] Patent Number: 5,604,487
[45] Date of Patent: Feb. 18, 1997

[54] APPARATUS AND METHOD FOR USER-SELECTIVE DATA COMMUNICATION WITH VERIFICATION

[75] Inventor: John D. Frymier, Downingtown, Pa.

[73] Assignee: Lockheed Martin Tactical Systems, Inc., New York, N.Y.

[21] Appl. No.: 100,657

[22] Filed: Jul. 30, 1993

[51] Int. Cl.$^6$ ................................................ G05B 23/02
[52] U.S. Cl. ............................. 340/825.07; 340/825.26; 395/200.09; 379/107
[58] Field of Search ...................... 364/401, 403, 364/408, 420; 340/825.07, 825.26, 825.27; 379/107, 90, 91, 92, 93, 94, 88; 395/200.09

[56] References Cited

U.S. PATENT DOCUMENTS

| | | |
|---|---|---|
| 4,009,344 | 2/1977 | Flemming . |
| 4,031,512 | 6/1977 | Faber . |
| 4,422,171 | 12/1983 | Wortley et al. . |
| 4,432,090 | 2/1984 | da Silva . |
| 4,450,572 | 5/1984 | Stewart et al. . |
| 4,488,287 | 12/1984 | Carter et al. . |
| 4,490,785 | 12/1984 | Strecker et al. . |
| 4,490,788 | 12/1984 | Rasmussen . |
| 4,560,985 | 12/1985 | Strecker et al. . |

(List continued on next page.)

FOREIGN PATENT DOCUMENTS

WO94/28683  12/1994  WIPO ............................. 340/825.08

OTHER PUBLICATIONS

T. W. Madron, *Local Area Networks: The Next Generation*, 2nd Ed. (John Wiley & Sons, New York, 1990) pp. 24–40.

*Federal Meteorological Handbook No. 11 Doppler Radar Meteorological Observations: Part A Systems Concepts, Responsibilities, and Procedures*, FCM–H11A–1991 (Interim Version One) (Office of the Federal Coordinator forMeteorological Services and Supporting Research, National Oceanic and Atmospheric Administration, U.S. Department of Commerce, Washington, DC, Jun. 1991).

R. R. Hoyt and Dr. W. J. Kenny, "A Network Architecture" in *Proceedings of the IEEE NAECON 1984*, vol. 1/2, May 21, 1984, pp. 135–142.

R. Perlman, A. Harvey and G. Varghese, "Choosing the Appropriate ISO Layer for LAN Interconnection" in *IEEE Network*, vol. 2, No. 1, Jan. 1988, pp. 81–86.

*Primary Examiner*—Brian Zimmerman
*Attorney, Agent, or Firm*—Stanton D. Weinstein; Glenn W. Bowen

[57] ABSTRACT

Apparatus and method for communication of data from a holder to a customer or other requester of such data. The requester identifies to the holder a specific data product or other piece of data known to be held by the holder. The holder responds with a message acknowledging that request and providing at least one characteristic of the data so requested. The requester utilizes the information contained in that acknowledgement to determine whether the requester wants the data that it has so identified. The requester then informs the holder, based on that determination, whether the requester still wants the holder to provide that data to the requester. In response to that message from the requester, the holder either transmits the requested data, or awaits a further request from that requester, or terminates the communication. This apparatus and method further includes a provision for verification of proper communication of requested data. Upon receipt of requested data, the requester determines the value of a predetermined error checking or fault detection code such as a checksum. The requester then provides this value or code to the holder as part of the requester's acknowledgement of receipt of the requested data. This value or code is then compared by the holder with an internally generated such value or code to determine whether the transmitted data has been properly received. The holder thereby is also assured that the recipient of the data has taken necessary steps to verify the accuracy or integrity of the communicated data.

27 Claims, 10 Drawing Sheets

U.S. PATENT DOCUMENTS

| | | |
|---|---|---|
| 4,584,680 | 4/1986 | Carter et al. . |
| 4,584,684 | 4/1986 | Nagasawa et al. . |
| 4,584,685 | 4/1986 | Gajjar . |
| 4,592,072 | 5/1986 | Stewart . |
| 4,649,533 | 3/1987 | Chorley .................................. 379/94 |
| 4,677,617 | 6/1987 | O'Connor et al. . |
| 4,712,214 | 12/1987 | Meltzer et al. . |
| 4,715,045 | 12/1987 | Lewis et al. . |
| 4,740,909 | 4/1988 | Conklin et al. . |
| 4,754,326 | 6/1988 | Kram et al. . |
| 4,768,144 | 8/1988 | Winter et al. . |
| 4,777,595 | 10/1988 | Strecker et al. . |
| 4,780,869 | 10/1988 | Engdahl et al. . |
| 4,831,620 | 5/1989 | Conway et al. . |
| 4,839,801 | 6/1989 | Nicely et al. . |
| 4,845,722 | 7/1989 | Kent et al. . |
| 4,853,875 | 8/1989 | Brown . |
| 4,868,866 | 9/1989 | Williams, Jr. .................... 340/825.26 |
| 4,887,076 | 12/1989 | Kent et al. . |
| 4,897,833 | 1/1990 | Kent et al. . |
| 4,908,828 | 3/1990 | Tikalsky . |
| 4,926,375 | 5/1990 | Mercer et al. . |
| 4,972,368 | 11/1990 | O'Brien et al. . |
| 4,992,940 | 2/1991 | Dworkin ................................ 364/408 |
| 4,999,768 | 3/1991 | Hirokawa . |
| 5,020,020 | 5/1991 | Pomfret et al. . |
| 5,067,104 | 11/1991 | Krishnakumar et al. . |
| 5,068,665 | 11/1991 | Piazza et al. . |
| 5,077,665 | 12/1991 | Silverman et al. ..................... 364/408 |
| 5,096,139 | 3/1992 | Feld et al. . |
| 5,105,382 | 4/1992 | Ogasawara . |
| 5,146,404 | 9/1992 | Calloway ................................ 364/403 |
| 5,163,055 | 11/1992 | Lee et al. . |
| 5,181,204 | 1/1993 | Kasman . |
| 5,193,149 | 3/1993 | Awiszio et al. . |
| 5,297,032 | 3/1994 | Trojan et al. ..................... 340/825.26 |

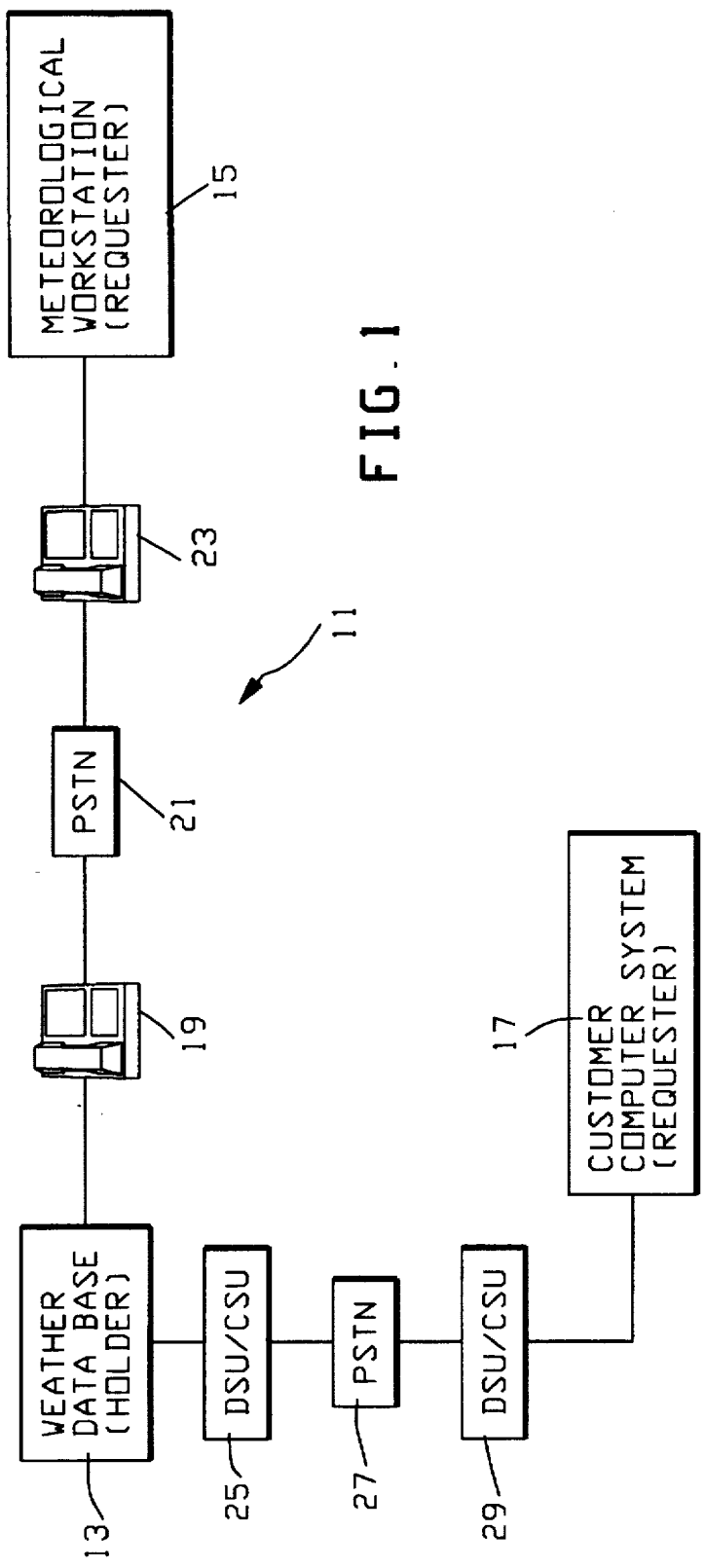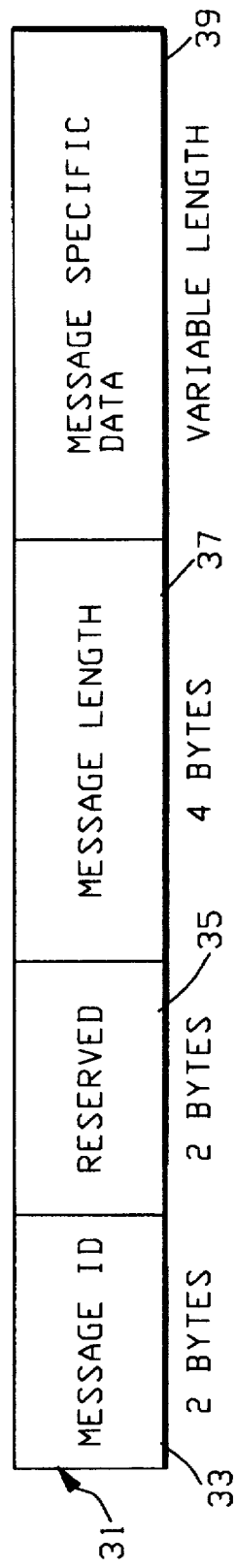

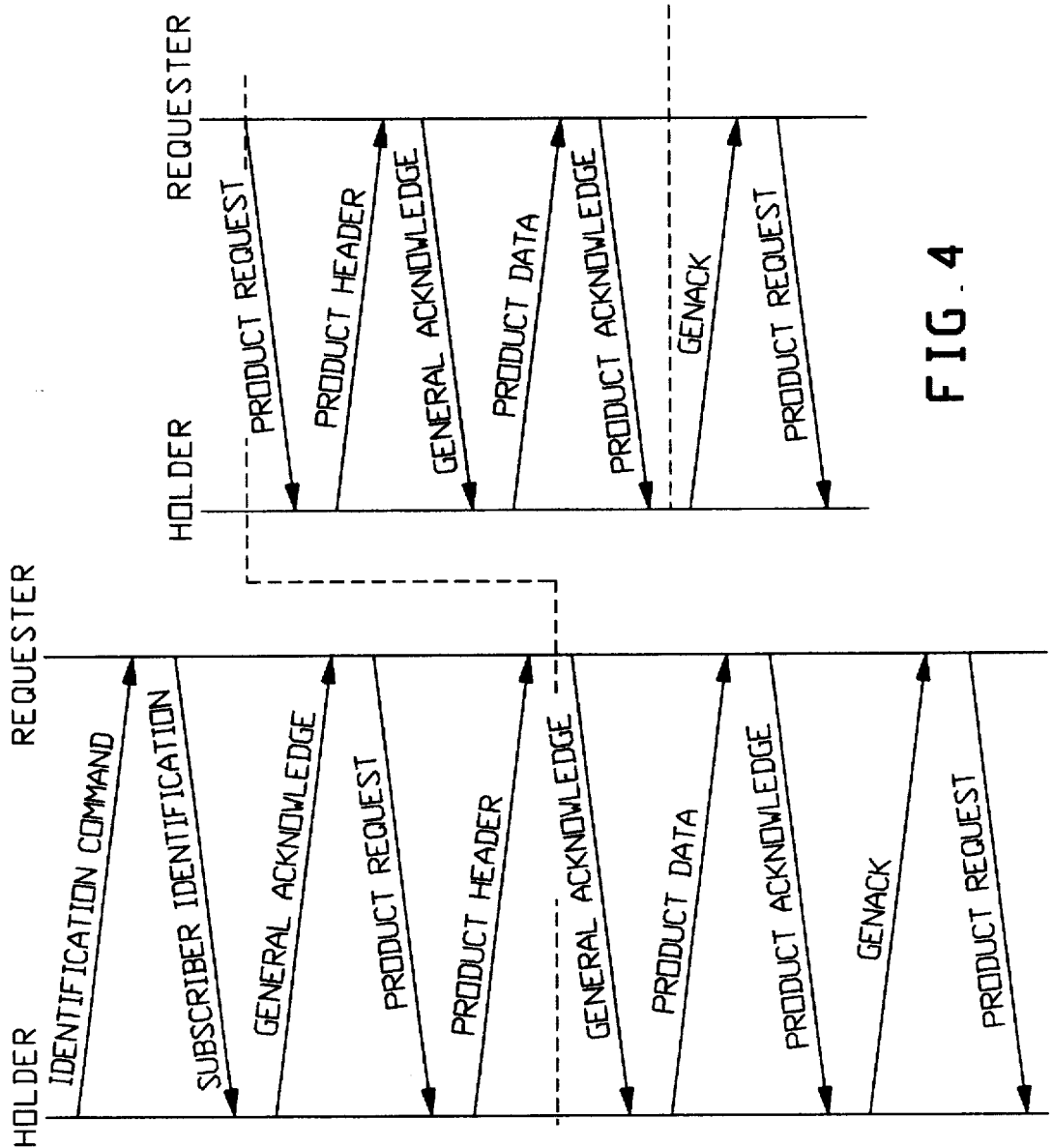

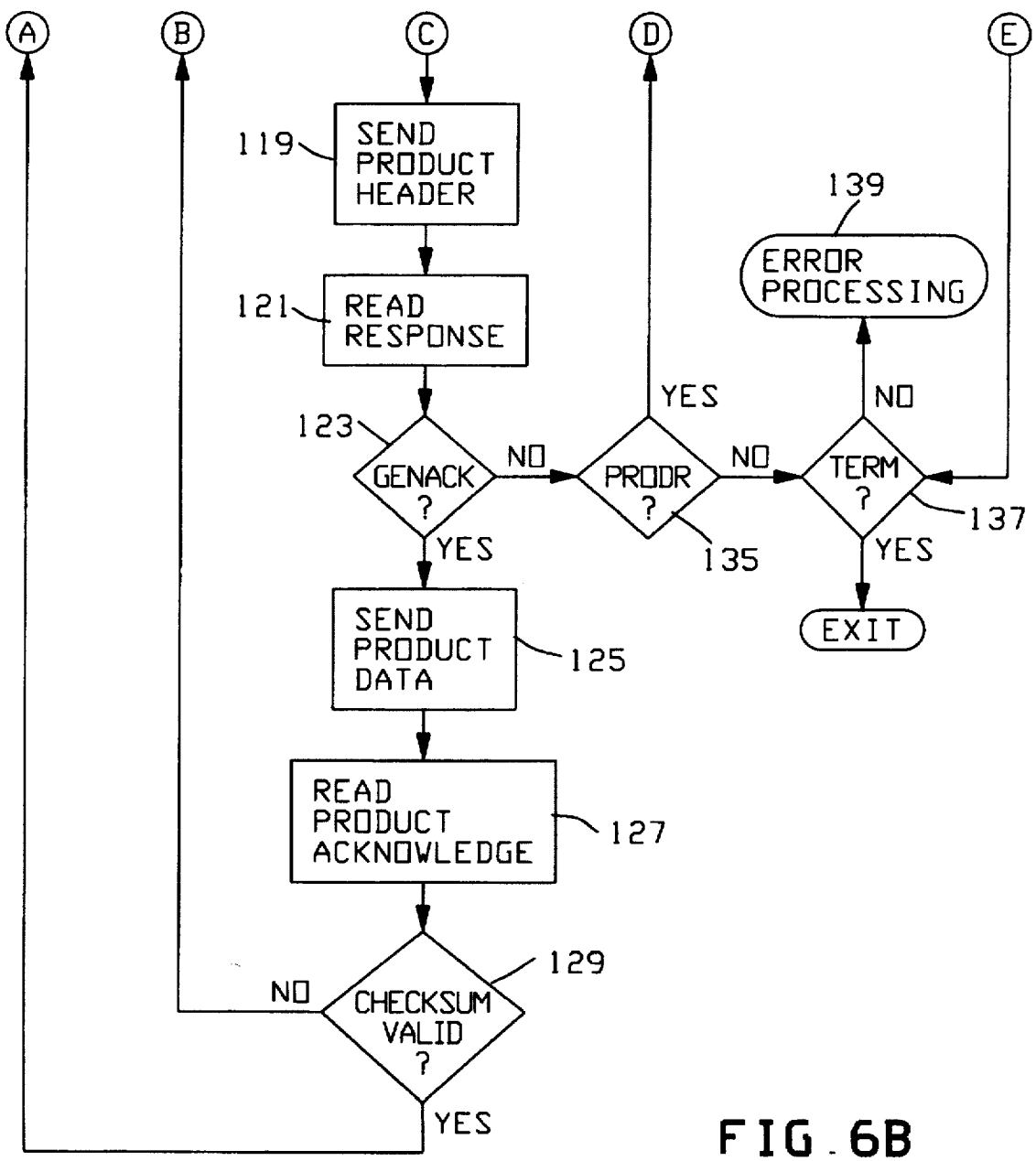
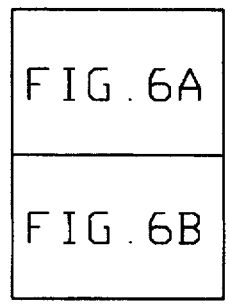
FIG.6

| FIG.7A |
| FIG.7B |

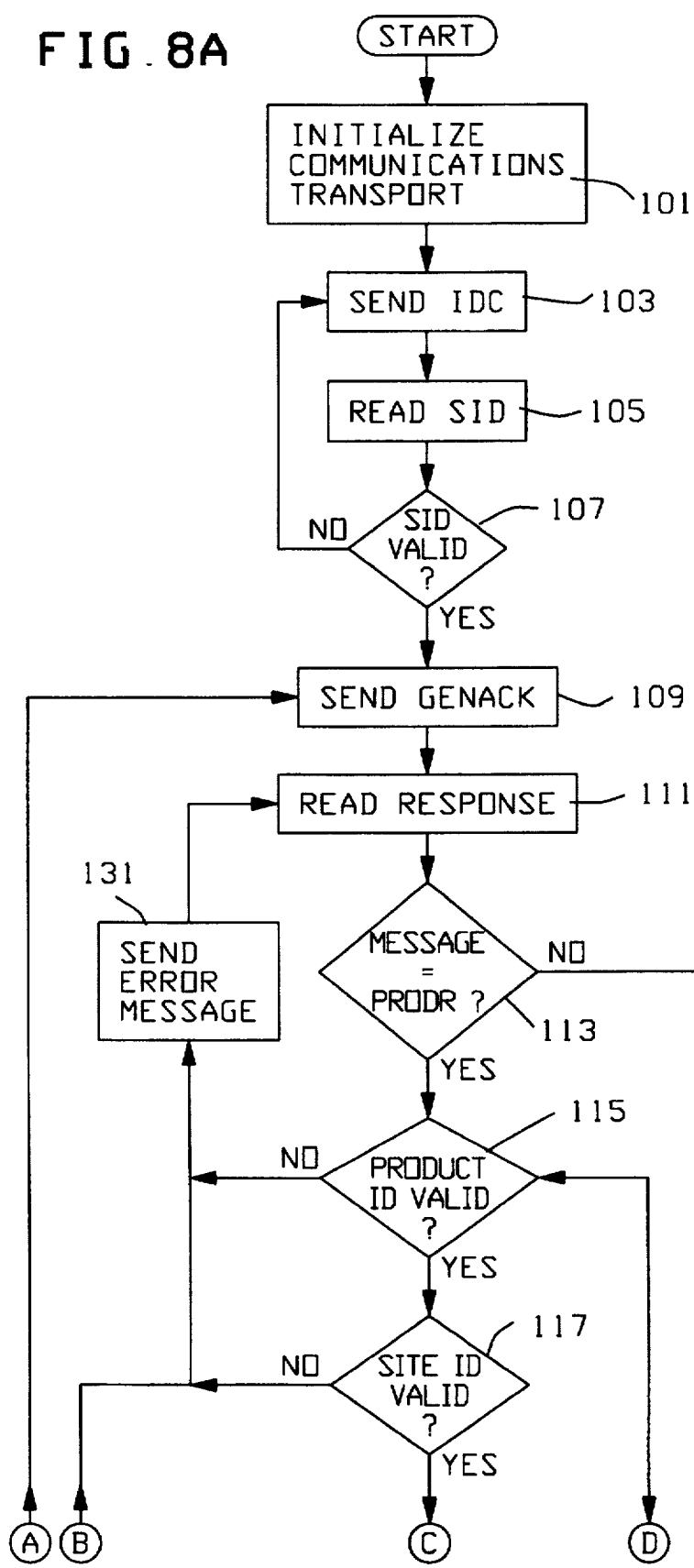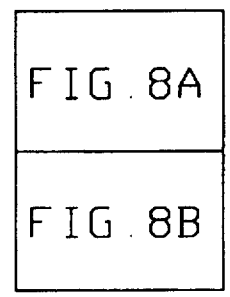

APPARATUS AND METHOD FOR USER-SELECTIVE DATA COMMUNICATION WITH VERIFICATION

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

The present invention relates to data processing, and more particularly to application or utilization of data processing in or for communication engineering. The present invention also relates to error detection/correction and fault detection/recovery, and more particularly to error checking/fault detection or integrity validation for a data transmission. The present invention further relates to electrical communications, and more particularly to selective data communications.

BACKGROUND OF THE INVENTION

There exist data communication applications in which there is a need to have a database interfaced to differing user accessing (e.g. computer) systems to allow such different systems to access that database and receive data therefrom. There also exist data communication applications in which there is a need to control data intake and communications costs so that receivers of data need not receive data that they do not need. The present invention fulfills these needs.

Data communications between different systems requires some standardization so that different systems can communicate with each other. One widely known and cited such standard is the International Standards Organization (ISO) Open Systems Interconnection (OSI) model or protocol, described in ISO Standard 7498 "Information Processing Systems—Open Systems Interconnection—Basic Reference Manual". This model involves a seven-layered hierarchy, with the highest-numbered layer reflecting the data actually seen by the user, the lowest-numbered layer reflecting the data as actually communicated, and intermediate layers reflecting different stages of processing, from the source (transferor or holder) down to the communications link and then back up to the destination (user or requester). In this model, layer 1 is the physical layer, layer 2 is the data link layer, layer 3 is the network layer, layer 4 is the transport layer, layer 5 is the session layer, layer 6 is the presentation layer and layer 7 is the application layer. The ISO OSI standard is further described in U.S. Pat. No. 4,831,620 issued May 16, 1989 to Conway et al. at column 3, line 22 through column 4, line 53; at column 1, line 43 through column 2, line 64 of U.S. Pat. No. 5,163,055 issued Nov. 10, 1992 to Lee et al.; at FIG. 2 and column 14, line 65 through column 16, line 51 of U.S. Pat. No. 4,853,875 issued Aug. 1, 1989 to Brown; and in T. W. Madron, *Local Area Networks: The Next Generation*, 2nd Ed. (John Wiley & Sons, New York, 1990) at pages 24–40. The Conway et al. patent, the Brown patent and the Madron book are hereby incorporated by reference herein. The ISO OSI Standard is also described in A. S. Tannanbaum, *Computer Networks* (Prentice Hall, 1981).

As stated at column 1, line 43 through column 2, line 64 of the Lee et al. patent, data communications, or computer communications, is the process of communicating information in a form suitable for processing by computers and peripheral devices that may be connected to those computers. Communications hardware is reasonably standard and generally presents few problems. However, when communication is desired among heterogeneous machines, i.e. machines made by different vendors or different models of machines made by the same vendor, the software development effort becomes increasingly difficult. Different vendors use different data formats and data exchange conventions. Even within one vendor's product line, different model computers may communicate in unique ways.

To facilitate computer communications and computer networking, computer vendors needed to adopt and implement a common set of conventions. However, in order to develop adequate standards, there needs to be a structure or architecture that defines the communication tasks. A formal hierarchial identification of all data communications network functions has been established by the International Standards Organizations ("ISO") and referred to as the ISO model for Open Systems Interconnection ("OSI"). This model identifies seven (7) distinct levels, or layers, of functional requirements pertaining to a data communications network. Each layer (i) performs a related subset of the functions required to communicate with another system; (ii) relies on the next lower layer to perform more primitive functions and to the details of those functions; and (iii) provides services for the next higher layer.

The OSI layers consist of (1) the physical layer which governs the physical interface between devices and the rules by which bits are passed from one to another; (2) the data link layer which attempts to make the physical link reliable, i.e. error-free, and provides the means to activate, maintain and deactivate the link; (3) the network layer which is responsible for establishing, maintaining, and terminating connections across an intervening communications facility; (4) the transport layer which insures that data units are delivered error-free, in sequence and without losses or duplications; (5) the session layer which provides means for two application processes to establish and use a connection, called a session; (6) the presentation layer which resolves differences in the syntax (representation) of the data exchanged between application entities and provides for the selection and subsequent modification of the syntax to be used; and (7) the application layer which contains management functions and other useful mechanisms to support distributed applications.

The OSI layers are defined so that changes in one layer do not require changes in the other layers. Communication is achieved by having corresponding or "peer" entities in the same layer in two different systems communicate via a protocol. A protocol is a set of rules governing a time sequence of events that take place between peer entities; that is, between equipment or layers on the same level.

The most common way in which protocols are realized is with the use of a header. When an application X has data to send to another application Y, it transfers those data to an application entity in the application layer. A header is appended to the data that contains the required information for the peer layer 7 protocol. The original data, plus the header, is now passed as a unit to layer 6. The presentation entity treats the whole unit as data, and appends its own header. This process continues down through layer 2, which generally adds both a header and a trailer. This layer 2 unit, called a frame, is then passed by the physical layer onto the transmission medium. When the frame is received by the target system, the reverse process occurs. As the data ascends, each layer strips off the outermost header, acts on the protocol information contained therein, and passes the remainder up to the next layer.

In general, the reliability of a data communications system may be directly traced to the functional effectiveness of the data link layer protocol being used. Because data is usually sent in blocks (frames), the beginning and end of each block (frame) must be clearly identifiable. Further, the sending station must not send frames at a rate faster than the receiving station can absorb them. Additionally, the bit errors introduced by the transmission system must be corrected. Also, the receiver must be able to distinguish control information from the data being transmitted.

Particularly but not exclusively with regard to weather databases, there is a need to address quality control. Quality control of transmitted weather and other imagery data has historically been imprecise because no positive method existed which could determine that what was received was exactly what was transmitted. Following the occurrence of an incident in which weather played a factor, principals involved responsible for avoiding such incidents may have claimed that data required for them to fulfill their responsibility was either missing, incomplete, or in error. Because no mechanism exists to provide traceability along the delivery chain of the weather data, each party transferring such data bears a liability for its accurate communication. Accordingly, there is a need for a mechanism to assure that the weather product received by such a transferor, and the weather product transmitted to and received by a customer of that transferor, are identical, in order to shield the transferor from liability for quality of the transmitted product. The present invention also fulfills these needs.

Previous radar dissemination systems required solicitation of data from different physical sources, and only allowed the acceptance of one product. In order to tell whether there is any relevant weather at the site, a complete product had to be received and interpreted by the user.

The Weather Surveillance Radar—1988 Doppler (WSR-88D) is described in Federal Meteorological Handbook No. 11 *Doppler Radar Meteorological Observations: Part A Systems Concepts, Responsibilities, and Procedures*, FCM-H11A-1991 (Interim Version One) (Washington, D.C., June 1991) produced by the Office of the Federal Coordinator for Meteorological Services and Supporting Research, National Oceanic and Atmospheric Administration, U.S. Department of Commerce. The development and deployment of the WSR-88D radar in the early 1990's had a profound impact on the accessibility of and physical size of weather radar imagery. Prior to the deployment of the WSR-88D radar, only one product, reflectivity, was available to the general public. This reflectivity product ranged in size from about 8500 bytes in a compressed format to around to 32,000 bytes as a raw raster image. The WSR-88D radar provides 19 distinct radar products to the general public. As described in Handbook No. 11, supra, these nineteen products are Reflectivity Tilt 1, Reflectivity Tilt 2, Reflectivity Tilt 3, Reflectivity Tilt 4, Composite Reflectivity, Echo Tops, Vertically Integrated Liquid, Surface Rainfall Accumulation 1 hour total, Surface Rainfall Accumulation 3 hour total, Storm Total Rainfall Accumulation, Hourly Digital Precipitation, Mean Radial Velocity Tilt 1, Mean Radial Velocity Tilt 2, Mean Radial Velocity Tilt 3, Mean Radial Velocity Tilt 4, Velocity Azimuth Display, Layer Composite Reflectivity Layer 1, Layer Composite Reflectivity layer 2, and Layer Composite Reflectivity Layer 3. These 19 products can each range in size from about 2,000 bytes to over 50,000 bytes depending on the severity of the weather. Also, the National Weather Service uses numerous (presently over 150) WSR-88D radars, at different sites scattered across the U.S.A. Each such site thus generates each of the 19 radar products. Accurate weather forecasting necessitates rapid accessibility of all this data. However, not all of this data will always be useful to a weather forecaster.

The 19 distinct WSR-88D radar products can each range in size from about 2,000 bytes to over 50,000 bytes as a function of the severity of the weather. Multiplied by the many WSR-88D sites presently operating or planned or under construction, the weather forecaster is thus presented with a substantial number of present and future available products. Not all of these products will be useful at any one given time. In order to keep communications costs down, a user of this data needs to avoid transmission to it (particularly at its expense) of weather products that are not useful to that user. Such users also need to verify the end-to-end integrity of the product transmission, for example to avoid having noise or distortion prevent the user from identifying a potential tornado in Kansas. Since weather patterns can change and move relatively rapidly, and accurate weather forecasting can have a very substantial monetary as well as practical value, there is a critical need for accuracy of received weather data. The present invention fulfills these needs.

Furthermore, where, such as with weather data, the data is being provided by a transferor, and there is a strong need for the data to be accurate, it is necessary for the recipient of the data to verify its integrity. It is also necessary for the transferor to both verify the integrity of the transmitted data, and confirm that the recipient has verified the accuracy or integrity of the data. The present invention also fulfills these needs.

SUMMARY OF THE INVENTION

Accordingly, an object of the present invention is to provide apparatus and method for communication of data, which apparatus and method permit a user of such data to evaluate certain quality(ies) or characteristic(s) of such data, and to determine whether that user needs the data, before it is transmitted to the user. The communication can be between widely or closely separated or adjacent locations, and is particularly useful for relatively large blocks of data such as but not limited to weather data.

Another object of the present invention is to provide apparatus and method for verifying the accuracy or integrity of communicated (e.g. transmitted and received) data.

A further object of the present invention is to provide apparatus and method for data communication capable of providing a verification that the recipient of data communicated thereby has verified the accuracy or integrity of that data.

Still another object of the present invention is to provide apparatus and method for transmitting binary data from a holder of that data to a requester of that data which allows for the request of specific data products, an examination of a product description (e.g. product size and time of product creation) by the requester before transmission of the actual product data, and a verification to the holder of the data that the requester received the product exactly as transmitted and that the requester has himself checked the accuracy or integrity of the communicated data.

A still further object of the present invention is to provide apparatus and method for data communications whereby a potential receiver of data can make real-time decisions about whether the data to be provided is useable by or desirable to such receiver.

Yet another object of the present invention is to provide apparatus and method for data communication in which the recipient of data is able to verify the accuracy or integrity of such data, and the transmitter of that data can receive confirmation both of the accuracy or integrity of the data and that the receiver has so checked the received data.

A still further object of the present invention is to provide apparatus and method for reducing or controlling the exposure or liability of the transmitter of valuable data for the reception of data which is distorted, corrupted by noise or otherwise has had its integrity impaired by the transmission of such data.

Still another object of the present invention is to provide apparatus and method for data communication which is capable of reducing communications costs by lowering the amount of data traffic required to solicit and obtain relevant data.

Yet another object of the present invention is to provide a data communication mechanism for receivers of data to be informed of one or more characteristics of specific data so as to be able to make real-time decisions about whether there is a need to receive that data. Both the total volume of data intake by such receivers, and data communications costs, can thereby be controlled.

Briefly, these and other objects of the present invention are accomplished by a data communication system and method by which data such as contained in a database can be accessed by a local or distant requester of specific such data. After handshaking to verify the identity of the requester and thus the propriety of his request, the requester identifies to the data holder or server a specific piece of requested data. In response, the data holder provides to the requester certain characteristics or qualities of that data, so that the requester can determine whether that data is needed. If so, then the requester instructs the holder to transmit the data. If not, then the requester can either make a request for another piece of data, or else terminate the session if no further data is then needed. The transfer protocol for such data communication includes a product level checksum or similar error checking/fault detection scheme which provides an end-to-end integrity check for the data communication. The product checksum or other check is then determined by the recipient. The transmitter waits to receive the receiver calculated checksum before acknowledging whether the checksum (and thus the data) is correct. If the correct check is not provided to the receiver, then the validation of data integrity cannot be falsified by the receiver, thereby providing assurance to the holder or transmitter that the data was accurately received.

Other objects, advantages and novel features of the invention will become apparent from the following detailed description of the invention when considered in conjunction with the accompanying drawings.

BRIEF DESCRIPTION OF THE DRAWINGS

In the drawings,

FIG. 1 is a block diagram of a data communication system according to the present invention;

FIG. 2 is a block diagram of a message format utilized in communications in the system of FIG. 1;

FIG. 3 is a sequence flowchart of one sequence of operation accomplished by an embodiment of the present invention;

FIG. 4 is a sequence flowchart of a different sequence of operation for the embodiment of FIG. 3;

FIG. 5 is a sequence flowchart of still another sequence of operation for the embodiment of FIGS. 3 and 4;

FIGS. 6A and 6B together show a flowchart of one embodiment of the processing performed by the holder of FIG. 1, arranged as shown in FIG. 6;

FIGS. 8A and 8B together shown a flowchart of another embodiment of the processing performed by the holder of FIG. 1, arranged as shown in FIG. 8.

DESCRIPTION OF THE PREFERRED EMBODIMENTS

Figure 6A:
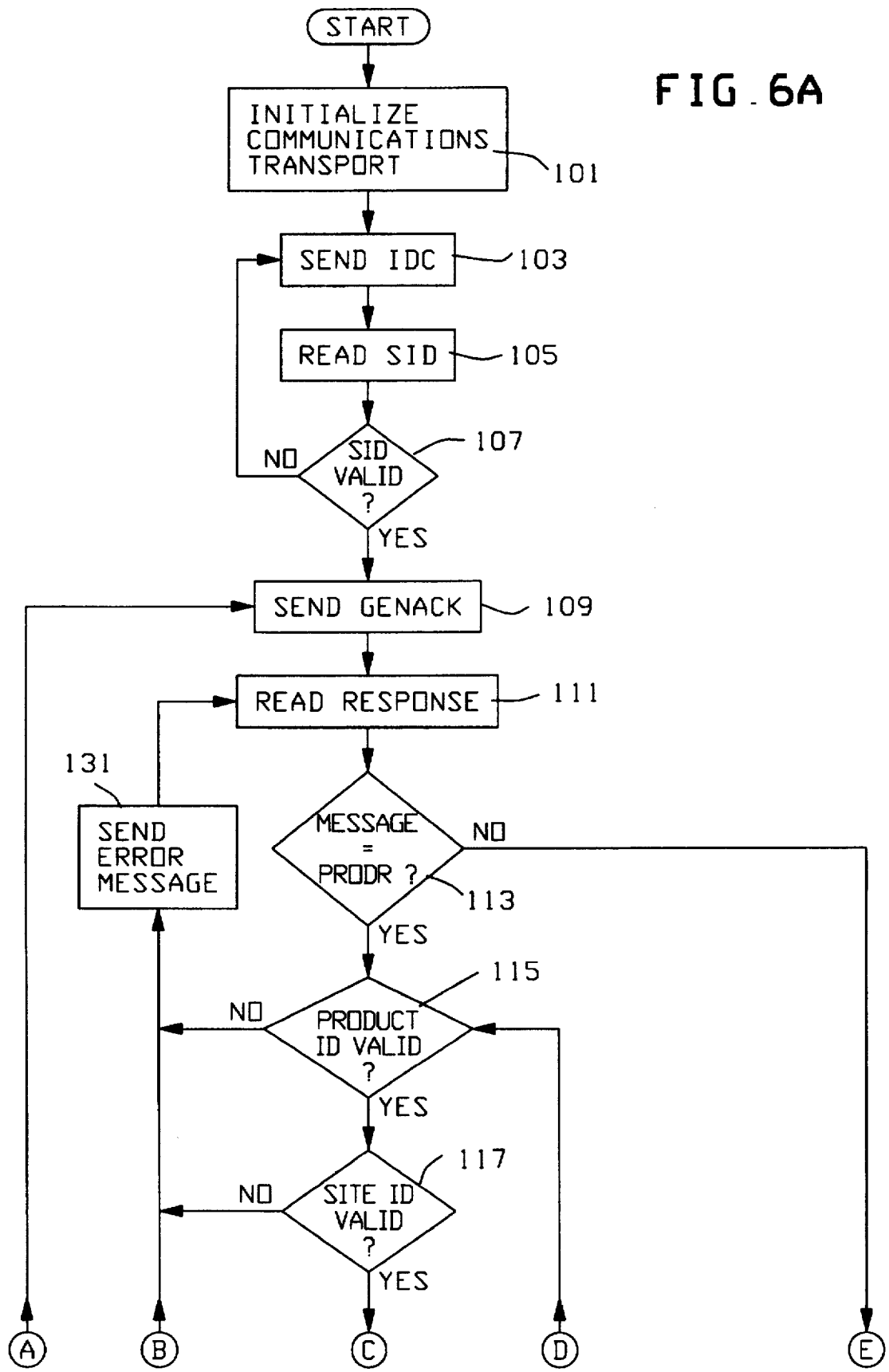

Referring again to the ISO OSI Standard described above, the present invention inter alia employs a protocol that operates at and accomplishes transport layer 4 and session layer 5. This protocol provides for the exchange of weather image product data or other data between a hub processor or a mainframe computer containing a database, and a subscriber's equipment. The defined formats for one embodiment of the present invention are preferably the content of the data fields of X.25 packets. The X.25 Data Communication Standard can be utilized for data link layer 2 and network layer 3, and is preferred for one embodiment; alternatively, an asynchronous accomplishment of those layers is illustrated in a portion of each of FIGS. 8 and 9. Physical layer 1 can for example be implemented in long-distance telephone lines. Presentation layer 6 and application layer 7 are transparent to the present invention, and may be defined by the user as needed. However, workstation 15 of FIG. 1 can for example be a Sun UNIX workstation, and if so then presentation layer 6 can be X-Windows, and application layer 7 can be what the workstation software allows the user looking at the display and image in the X-Window to do. Alternatively, workstation 15 can for example be an IBM PC personal computer or similar personal computer, and if so then presentation layer 6 is provided by Microsoft Windows 3.1, and application layer 7 can be what the workstation allows the operator to do with the image once it is displayed. Implementation of the ISO OSI model by one embodiment of the present invention can therefore be summarized as: Layer 7 Application—user defined; Layer 6 Presentation—user defined; Layer 5 Session and Layer 4 Transport—the protocol of FIGS. 3–7; Layer 3 Network—X.25 point-to-point packet; Layer 2 Data Link—X.25 Link Access Protocol B (LAPB); and Layer 1 Physical—various. The protocol is governed by the side holding the data products, i.e. the holder or hub. The protocol includes security features in the form of a login sequence, where the subscriber logs in to the network that includes the holder, and the holder verifies that the subscriber is an authorized user. There is a single message format to effect product transfer.

Although the following description of the figures is particularly directed to request and provision of the Doppler radar weather image products described above (which are preferred), it should be understood that the present invention is not limited thereto, but can be utilized with other types of data.

Referring now to the drawings, wherein like reference characters designate like or corresponding parts throughout the several views, there is shown in FIG. 1 a data communication system 11 illustrating two different hardware paths that could be used for data communication between a data holder 13 and a data requester. Although only one of each of these two types of data paths are illustrated in FIG. 1, and only a total of two such paths are thus so illustrated, it should be understood that the present invention can be practiced with any number of each such path and with any number of total data flow paths. Holder 13 is capable of transmitting binary data to requester 15, requester 17, or some other requester. As shown in FIG. 1, in the practice of the present invention, data can be requested by a workstation 15, such as a meteorological workstation, and by a customer computer system 17. Database 13 is preferably, but need not be, a weather database. Database 13 can for example be resident in the memory of a mainframe computer serving as a network hub. Where workstation 15 is a meteorological workstation, it is a place where a meteorologist would perform meteorological tasks, one of which is gathering data into the workstation so that the meteorologist can look at the gathered data and manipulate same. Workstation 15 and customer computer system 17 can each be for example a facsimile transmission/reception machine (now commonly referred to as a fax machine), a personal computer, or a memory. On one data communication path of FIG. 1, workstation 15 is connected to database 13 via modem 19, public switch telephone network (PSTN) 21 and modem 23. PSTN 21 and PSTN 27 can each for example be the long distance network of AT&T, MCI, or Sprint. This path thereby provides a capability to provide data transport with packetized error checking, further discussed below with regard to FIGS. 8 and 9. Data communications between database 13 and customer computer system 17 can be provided by data service unit/channel service unit (DSU/CSU) 25, PSTN 27 and DSU/CSU 29. DSU/CSU 25 and DSU/CSU 29 can each be a digital equivalent of a modem. Modem 23 can be used to perform regular asynchronous dial-up access capability through PSTN 21. The data path provided by DSU/CSU 25, PSTN 27 and DSU/CSU 29 provides a capability to provide data transport over appropriate ISO layer 2 and 3 protocols such as X.25. PSTN 27 can for example be a dedicated synchronous X.25 connection, which again can use the long distance network of AT&T, MCI, Sprint, etc. PSTN and PSTN 27 can for example be the same network.

FIG. 2 illustrates the basic message structure 31, for the various headers, identifications, and other messages sent on the system of FIG. 1. This basic message structure 31 includes a two byte message identification field 33, beginning at the most significant bit of the message structure, for identifying the type of message. The next field 35 is two bytes wide and is a reserved area for future expansion. The adjoining field 37 is four bytes wide and defines the length of the message by providing a number which indicates the total number of bytes that is in the message. The message length field 37 of FIG. 2 permits the use of variable length packets. The remaining field 39 contains message specific data, and is of variable length depending on the actual length of the data as needed. All of the messages identified in FIGS. 3–9 conform to the basic message structure of FIG. 2. As used herein, the term "byte" refers to 8 bits, and the term "word" refers to 16 bits.

Communications between a holder (such as holder 13) and a requester (such as requester 15 or 17) of data is illustrated in FIGS. 3–5. During this process, the holder and requester are each conducting their own processing, respectively illustrated in FIG. 6 and FIG. 7 for one embodiment of the present invention. FIG. 3 illustrates the main product demand path. As illustrated in FIG. 3, once the requester has accessed the holder, such as is illustrated in FIG. 1, the holder sends the requester an identification command (IDC) message instructing the requester to identify itself, usually by providing an identification code and a password. A preferred format for the IDC is illustrated in Table 1.

TABLE 1

| | Identification Command (IDC) | |
|---|---|---|
| Word | 111111 (bits)<br>5432109876543210 | Comment |
| 0 | 0000000010000001 | (129) message id |
| 1 | 0000000000000000 | reserved |
| 2 | 0000000000001000 | (8) message length in bytes |
| 3 | 0000000000000000 | (32 bit number) |

Copyright ©1992 by Paramax Systems Corporation, A Unisys Company

In this message format and in the other message formats given below, the transmission order of bytes reflects the "Little Endian" method of byte storage, where the least significant byte of a 16 bit word is transmitted first and stored "leftmost". The least significant 16 bit word of a 32 bit entity is also transmitted first and stored leftmost. For each word of the IDC of Table 1, each bit is provided with an identification number, from 0–15 reading right to left. The IDC is sent by the holder to a requester when the dial-in or other connection between that requester and the holder is initially established. The IDC may also be sent between product transmissions as a security measure. The IDC also serves as a protocol level reset when the holder becomes confused; since the IDC is always a valid message, it will cause the requester/subscriber to abort any product reception that might be underway and respond with a subscriber identification (SID) message. On the comment side of Table 1, as with the other message formats given below, an arabic number in parentheses usually indicates the decimal value of the bits for that word illustrated in the second column of the format.

The proper response to an IDC sent from a holder to a requester is transmission to the holder by the requester of a subscriber identification (SID) message. A preferred format for an SID is illustrated in Table 2 below.

TABLE 2

| | Subscriber Identification (SID) | |
|---|---|---|
| Word | 111111 (bits)<br>5432109876543210 | Comment |
| 0 | 0000000010000010 | (130) message id |
| 1 | 0000000000000000 | reserved |
| 2 | 0000000000101000 | (40) message length in bytes |
| 3 | 0000000000000000 | (32 bit number) |
| 4 | | user identification |
| 5 | | up to 15 ASCII characters allowed: |
| 6 | | A–Z, upper and lower case |
| 7 | | 0–9, numeric digits |
| 8 | | no spaces allowed |
| 9 | | this field must be zero (0) terminated |
| 10 | | |
| 11 | 00000000 | |
| 12 | | password |
| 13 | | up to 15 ASCII characters allowed: |
| 14 | | A–Z, upper and lower case |
| 15 | | 0–9, numeric digits |

TABLE 2-continued

Subscriber Identification (SID)

| Word | 111111 (bits)<br>5432109876543210 | Comment |
|---|---|---|
| 16 | | no spaces allowed |
| 17 | | this field must be zero (0) terminated |
| 18 | | |
| 19 | 00000000 | |

Copyright ©1992 by Paramax Systems Corporation, A Unisys Company

The message specific data field 39 of the SID includes a user identification code and a password. If the requester's SID is valid, then the holder will respond with a general acknowledgement (GENACK) message. A preferred message format for a GENACK is illustrated in Table 3 below.

TABLE 3

General Acknowledgement (GENACK)

| Word | 111111 (bits)<br>5432109876543210 | Comment |
|---|---|---|
| 0 | 0000000010001011 | (139) message id |
| 1 | 0000000000000000 | reserved |
| 2 | 0000000000001000 | (8) message length in bytes |
| 3 | 0000000000000000 | (32 bit number) |

Copyright ©1992 by Paramax Systems Corporation, A Unisys Company

As is further discussed below, the GENACK is used for several purposes. As discussed above, it can be sent by the holder to the requester to acknowledge a valid SID. It can also be sent by either side (holder or requester) of a communication to acknowledge an error message, to free the errored side for the next transaction. It can be used by the holder to acknowledge a product acknowledgement (PACK) message from the requester, to inform the requester that the product was correctly transmitted (e.g. checksums for both sides agreed), and that the user of the requester is free to use the transmitted data product. It can also be used by the requester to acknowledge a product header (PH) message, and to inform the holder that the requester is ready to accept the product it had previously requested, as described by the product header.

In response to the GENACK from the holder following the requester's transmission of an SID, the requester now sends a product request (ProdR) to request the transmission of a specific product or piece of data held by the holder. As is further described below, the Product Request message can also be sent by the requester to request a specific product after receipt from the holder of a previous product, or after receiving from the holder a Product Header for a requested data product which the requester decides not to receive, or after receiving from the holder an error message for an invalid product request. A preferred format for the ProdR message is shown in Table 4 below.

TABLE 4

Product Request (ProdR)

| Word | 111111 (bits)<br>5432109876543210 | Comment |
|---|---|---|
| 0 | 0000000010000100 | (132) message id |
| 1 | 0000000000000000 | reserved |
| 2 | 0000000000001100 | (12) message length in bytes |
| 3 | 0000000000000000 | (32 bit number) |

TABLE 4-continued

Product Request (ProdR)

| Word | 111111 (bits)<br>5432109876543210 | Comment |
|---|---|---|
| 4 | | originating site (16 bit number) |
| 5 | | product id (16 bit number) |

Copyright ©1992 by Paramax Systems Corporation, A Unisys Company

The holder responds to the Product Request with a product header (PH) message. In Table 4, Word 4 of a Product Request is a 16 bit number which uniquely identifies the site from which the product originates, and Word 5 is a 16 bit number which in combination with Word 4 uniquely describes the most recent version of a holder data product. In response to the Product Request, the holder transmits to the requester a Product Header (PH) message for the data product identified in the product request. In the product request message, the requester requests from the holder a specific product. The product header provided by the holder in response to a product request permits the requester to examine a product description before transmission of the actual product data. This product description includes product size and product age or time of creation. Within the practice of the present invention, other qualities or characteristics could be added to or substituted for either or both of size and time. A format for the Product Header is shown in Table 5 below.

TABLE 5

Product Header (PH)

| Word | 111111 (bits)<br>5432109876543210 | Comment |
|---|---|---|
| 0 | 0000000010000011 | (131) message id |
| 1 | 0000000000000000 | reserved |
| 2 | 0000000000011010 | (26) message length in bytes |
| 3 | 0000000000000000 | (32 bit number) |
| 4 | | reserved |
| 5 | | reserved |
| 6 | | date (16 bit number) |
| 7 | | time (32 bit number) number of |
| 8 | | seconds since last Zulu midnight |
| 9 | | originating site id (16 bit number) |
| 10 | | product id (16 bit number) |
| 11 | | product size (32 bit number) |
| 12 | | |

Copyright ©1992 by Paramax Systems Corporation, A Unisys Company

The product header acknowledges the originating site and product identification provided by the requester, and informs the requester of the size and age of the requested product. In Table 5, Word 6 represents the date of creation of the product. Words 7 and 8 represent the time of creation of the product. Word 9 identifies the originating site for the product, and Word 10 identifies the product; unless there is an error, this information should correspond to that provided in the product request. Words 11 and 12 provide a number indicating the size, in bytes, of the data contained in the requested product.

Figure 7A:
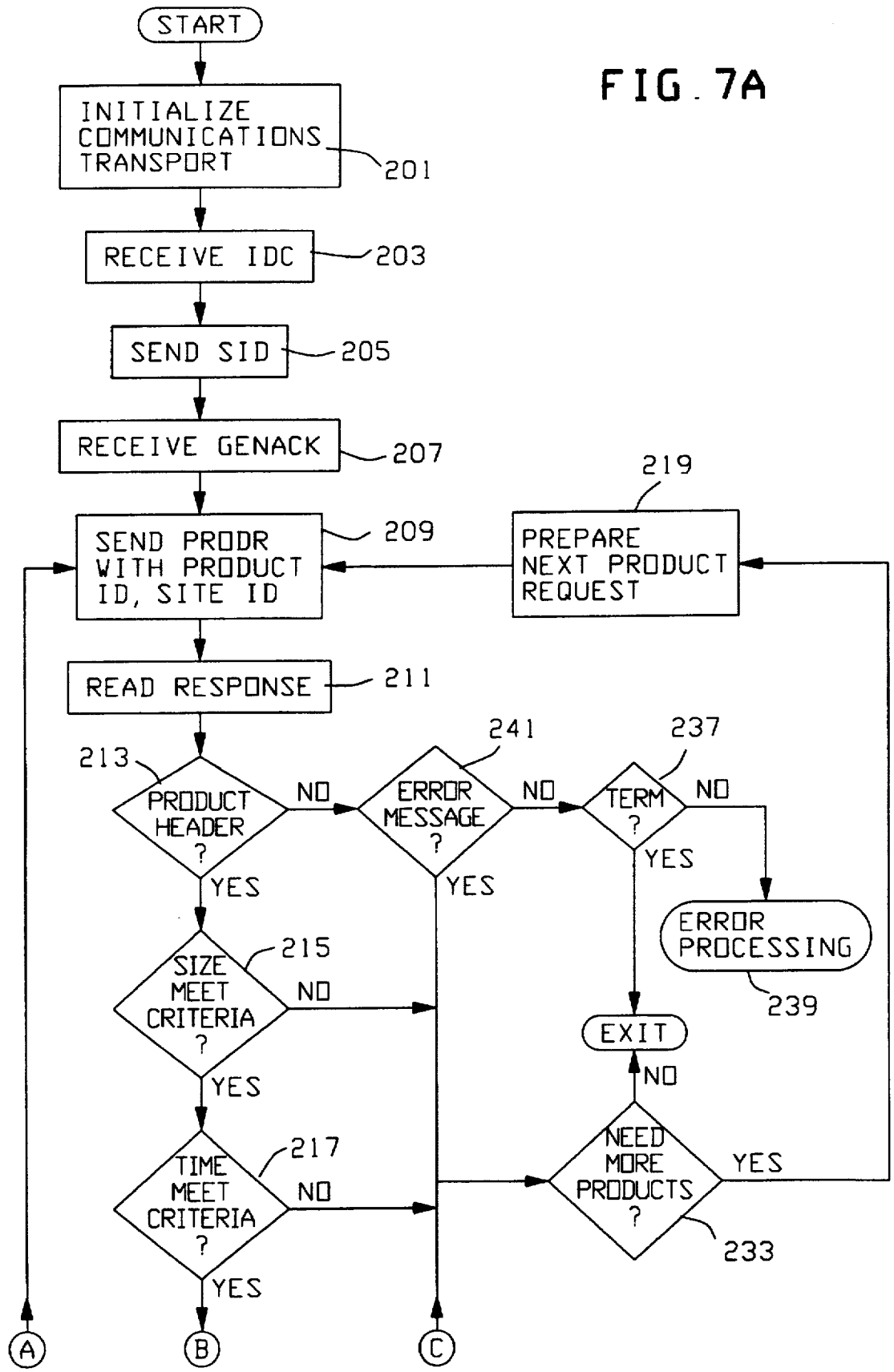
FIGS. 7A and 7B together show a flowchart of one embodiment of the processing performed by a requester of FIG. 1, arranged as shown in FIG. 7.
Figures 7, 7B:
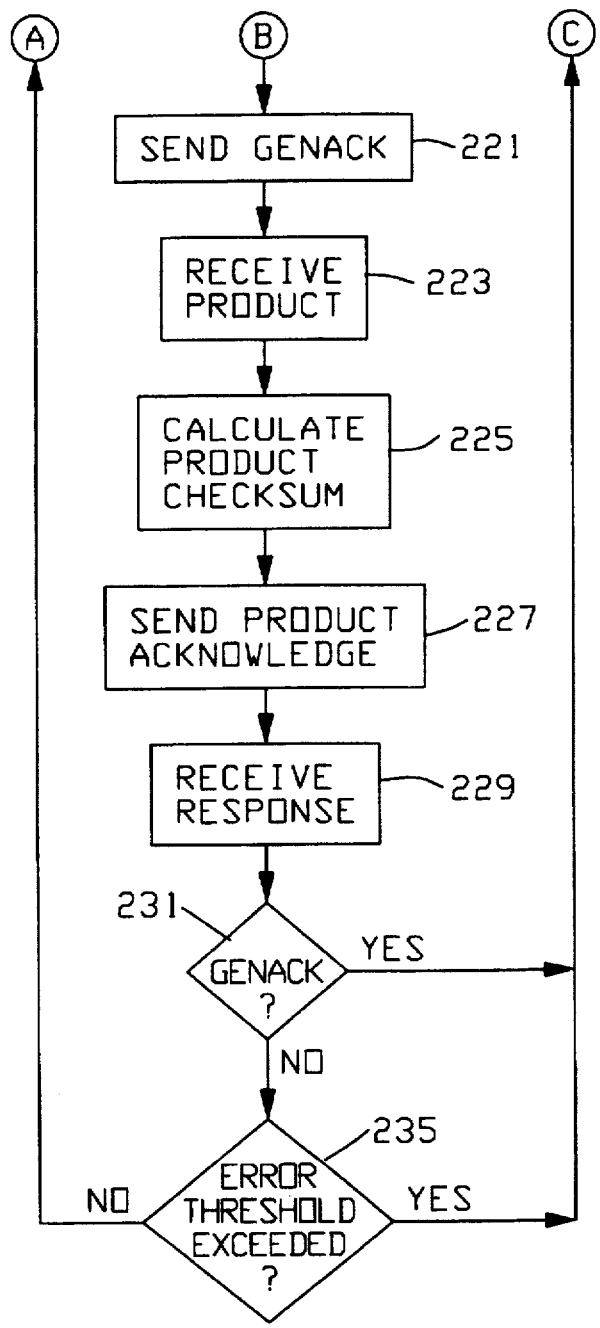

As illustrated in FIGS. 7A and 7B (sometimes together referred to herein as FIG. 7), the requester considers the size and age information contained in the product header to determine whether the requester wants that product. Each requester would be expected to have its own criteria for size and for timeliness, which criteria many vary with product and/or site. As discussed above, the size of a product indicates the severity of the weather represented by that product. The smaller the product size, the less severe the weather and the less likely that the product would be needed by the requester's user. Also, older data is less likely to be useful for weather forecasting, but may be useful for forensic (cause and effect) purposes. Other factors or characteristics could be added to or substituted for size and timeliness. However, for weather image data, size and timeliness are preferred in the practice of the invention. Should the size and creation time (and/or other qualities) of the product that are contained in the product header fall within the requester's preset acceptance criteria, then the requester responds with a general acknowledgement. This GENACK, following provision by the holder of a product header to that requester, signals the holder to send the data for the requested product. This general acknowledgement informs the holder that the requester accepted the contents of the previous product header, and that the requester is prepared to accept the product identified by that product header. As discussed above, a preferred format for the general acknowledgement is given in Table 3 above. In response, the holder sends the requested product data to that requester. A preferred format for such product data (PD) message is given in Table 6 below.

TABLE 6

Product Data (PD)

| Word | 111111 (bits)<br>5432109876543210 | Comment |
|---|---|---|
| 0 | 0000000010000110 | (134) message id |
| 1 | 0000000000000000 | reserved |
| 2 | | (variable) message length in bytes |
| 3 | | (32 bit number) |
| 4 | | product data<br>(variable length) |

Copyright ©1992 by Paramax Systems Corporation, A Unisys Company

In Table 6, Words 2 and 3 indicate the length of the actual product data in bytes for the entire product, i.e. the number of bytes in the requested product. For example, the value of the message length field 37 (Words 3 and 4) of the message header of Table 6 can equal the number of bytes in the entire product plus 8. Word 4 of Table 6, and the words that follow, contain the data for the entire product. The requester responds to its reception of product data from the holder with a product acknowledgement (PACK) message, providing the checksum or other error check/fault detection code value or indicator calculated or determined by the requester. After the holder transmits product data, and the requester performs at least a partial error check, the requester replies with the product acknowledgement. The product acknowledgement presents the product checksum or the like, calculated or determined by the requester, to the holder for comparison with the checksum value, or other corresponding indicator, that the holder has maintained internally. A preferred format for the product acknowledgement message is given in Table 7 below.

TABLE 7

Product Acknowledgement (PACK)

| Word | 111111 (bits)<br>5432109876543210 | Comment |
|---|---|---|
| 0 | 0000000010000111 | (135) message id |
| 1 | 0000000000000000 | reserved |
| 2 | 0000000000010000 | (16) message length in bytes |
| 3 | 0000000000000000 | (32 bit number) |
| 4 | | originating site (16 bit number) |
| 5 | | product id (16 bit number) |
| 6 | | product checksum (32 bit number) |
| 7 | | |

Copyright ©1992 by Paramax Systems Corporation, A Unisys Company

Word 4 of Table 7 identifies the site from which the product originates, while Word 5 identifies the product, for the product being so acknowledged; this information should correspond with that appearing in the product request and the product header, and identifies what the checksum of Words 6 and 7 is for. The product checksum of Words 6 and 7 is preferably a 32 bit number representing the CCITT recommended 32 bit polynomial checksum for the entire data content of the previously transmitted product that is now being acknowledged. If the checksum being provided in the product acknowledgement, matches the checksum that the holder has maintained internally as a tag to the product data, then the holder responds with a general acknowledgement. This general acknowledgement indicates a checksum match. This indicates that the holder and requester checksums agreed, and that the requester may use the transmitted product. It also indicates that the holder has discharged its responsibility to accurately transmit this product data. The requester may now make another product request if it wishes, or send a terminate connection (TERM) message if no more products are needed. The terminate connection message is sent by either side when either side wishes to terminate the communication. Alternatively, either side could simply break the communication link unilaterally. A preferred format for the terminate connection message is given in Table 8 below.

TABLE 8

Terminate Connection (TERM)

| Word | 111111 (bits)<br>5432109876543210 | Comment |
|---|---|---|
| 0 | 0000000010001000 | (136) message id |
| 1 | 0000000000000000 | reserved |
| 2 | 0000000000001000 | (8) message length in bytes |
| 3 | 0000000000000000 | (32 bit number) |

Copyright ©1992 by Paramax Systems Corporation, A Unisys Company

As described above, FIG. 3 indicates the main product demand path sequence of message exchanges between a holder of data and a requester of data. However, if a product header received by a requester does not satisfy the requester's acceptance criteria, then the requester would not respond with a general acknowledgement. Instead, as illustrated in FIG. 4, the requester would respond with a new product request, if another product is then desired. Alternatively, the requester could respond with a terminate connection message, or by unilaterally breaking the communication link with the holder.

For each site's data product, the holder determines and stores a checksum or other indicator, to be compared with the checksum or other indicator contained in a product acknowledgement for that site and product to verify proper reception of the product by the requester. As described above, in response to a product acknowledgement from a requester, the holder compares the checksum contained in the product acknowledgement message with the checksum for that site and product stored by the holder. If the two checksums match, indicating error-free communication of the product to the requester, then the holder responds with a general acknowledgement. However, as illustrated in FIG. 5, if the two checksums do not match, then the holder responds instead with an error message (ERRM) indicating that the requester has submitted a bad checksum. The error message informs the requester that the requester checksum does not agree with the checksum maintained by the holder. The requester should then not use the product that it has attempted to acknowledge, since the requester cannot tell itself if the checksum adds up or is correct. A preferred format for the error message is given in Table 9 below.

TABLE 9

Error Message (ERRM)

| Word | 111111 (bits) 5432109876543210 | Comment |
|---|---|---|
| 0 | 0000000010000101 | (133) message id |
| 1 | 0000000000000000 | reserved |
| 2 | | (variable) message length in bytes |
| 3 | | (32 bit number) |
| 4 | | error number (16 bit number) |
| 5 | | amplifying data (variable length) |
| . | . | . |
| . | . | . |
| . | . | . |

Copyright ©1992 by Paramax Systems Corporation, A Unisys Company

After provision of an error message by the holder to the requester indicating a bad requester checksum, the requester can then submit a new product request to elicit a corresponding product header, as described above. Alternatively, the requester could terminate the session by sending to the holder a terminate connection message or by simply breaking the telephone link or other link to the holder.

The error message format of Table 9 can be used to signal the presence of different errors. The particular error being so communicated is identified in Word 4 of Table 9; that error number corresponds to the number listed in Table 10 below. The amplifying data in the following word(s) is user defined; the size of the error message is controlled by the message length field 37 (Words 2 and 3) of the header. Use and interpretation of this amplifying data is optional.

TABLE 10

Error Messages

Err1 - holder transmitted an invalid message id
Err2 - holder timed out requester
Err3 - requester issued identification command
Err4 - requester issued product header
Err5 - requester invalid response
Err6 - requester issued product data
Err7 - requester timed out holder
Err8 - general error
Err9 - requester product reception error
Err10 - invalid product request message
Err11 - holder issued SID
Err12 - holder issued product request
Err13 - holder issued product ACK
Err14 - requester checksum does not agree with holder checksum Copyright ©1992 by Paramax Systems Corporation, A Unisys Company In response to an erroneous checksum provided by the requester, the error message would be provided by the holder to the requester indicating error number 14 (binary 1110). Utilization of the 14 different error messages is shown in Tables 11, 12 and 13, which also explain the on-demand protocol response to each possible pair of a message transmission and the reply thereto.

TABLE 11

Holder Perspective

| | | Requestor Replies | | | | | | | | | |
|---|---|---|---|---|---|---|---|---|---|---|---|
| | | Null | IDC | SID | PH | ProcR | ERRM | PD | PACK | TERM | GENACK |
| Holder Transmits | Null | UD | UD | UD | UD | UD | 16 (7) | UD | UD | UD | UD |
| | IDC | Err2 | Err3 | 1 | Err4 | Err5 | 2 (3) | Err6 | Err5 | 3 | Err5 |
| | SID | Err1 | Err1 | Err1 | Err1 | Err1 | 12 (1) | Err1 | Err1 | 3 | Err1 |
| | PH | Err2 | Err3 | Err5 | Err4 | 5 | 6 (*) | Err6 | Err5 | 3 | 4 |
| | ProdR | Err1 | Err1 | Err1 | Err1 | Err1 | 13 (1) | Err1 | Err1 | 3 | Erri |
| | ERRM | Err2 | Err3 | Err5 | Err4 | 7 | 8 (*) | Err6 | Err5 | 3 | 9 |
| | PD | Err2 | Err3 | Err5 | Err4 | Err5 | 11 (9) | Err6 | 10 | 3 | Err5 |
| | PACK | Err1 | Err1 | Err1 | Err1 | Err1 | 14 (1) | Err1 | Err1 | 3 | Err1 |
| | TERM | UD | UD | UD | UD | UD | UD | UD | UD | UD | UD |
| | GENACK | Err2 | Err3 | Err5 | Err4 | 18 | 15 (*) | Err6 | Err5 | 3 | 17 |

Copyright ©1992 by Paramax Systems Corporation, A Unisys Company

TABLE 12

Requester Perspective

| | | Holder Replies | | | | | | | | | |
|---|---|---|---|---|---|---|---|---|---|---|---|
| | | Null | IDC | SID | PH | ProdR | ERRM | PD | PACK | TERM | GENACK |
| Requester Transmits | Null | UD | 19 | Err11 | UD | Err12 | 20 (2) | Err1 | Err13 | 3 | Err1 |
| | IDC | UD | 27 | Err3 | Err3 | Err3 | 21 (3) | Err3 | Err3 | 3 | Err3 |

TABLE 12-continued

Requester Perspective

| | \multicolumn{10}{c|}{Holder Replies} | | | | | | | | | |
|---|---|---|---|---|---|---|---|---|---|---|
| | Null | IDC | SID | PH | ProdR | ERRM | PD | PACK | TERM | GENACK |
| SID | UD | 23 | Err11 | Err1 | Err12 | 24 (*) | Err1 | Err13 | 3 | 22 |
| PH | UD | 27 | Err4 | Err4 | Err4 | 25 (4) | Err4 | Err4 | 3 | Err4 |
| ProdR | UD | 23 | Err11 | 26 | Err12 | 28 (10) | Err1 | Err13 | 3 | Err1 |
| Errm | UD | 27 | Err11 | Err1 | Err12 | 8 (*) | Err1 | Err13 | 3 | 9 |
| PD | UD | 27 | Err6 | Err6 | Err6 | 32 (6) | Err6 | Err6 | 3 | Err6 |
| PACK | UD | 23 | Err11 | Err1 | Err12 | 34 (14) | Err1 | Err13 | 3 | 35 |
| TERM | UD | UD | UD | UD | UD | UD | UD | UD | UD | UD |
| GENACK | UD | 23 | Err11 | Err1 | Err12 | 37 (*) | 36 | Err13 | 3 | 17 |

UD — Undefined
number — indicates a valid situation, situations are explained by number
number (number) — valid situation where likely error reported is (number)
number (*) — valid situation where likely error reported is unknown
Copyright ©1992 by Paramax Systems Corporation, A Unisys Company

TABLE 13

Situation Descriptions

Situation 1 - requester replies with a Subscriber Identification after holder sends an Identification Command.

Situation 2 - requester replies to an Identification Command with an Error Message. The error message could contain any error code, but most likely this will be an Err3, since a requester should not command the holder to identify itself.

Situation 3 - It is always valid for either side to send the Terminate command.

Situation 4 - The holder has transmitted an holder Product Header, and the requester replies with a General Acknowledgement. This indicates the requester is ready to accept the product previously requested, and described by the holder Product Header.

Situation 5 - The holder transmitted a holder Product Header, and the requester replied with a Product Request. This indicates that, for whatever reason, the requester no longer desires the product represented by the holder Product Header, and now wants the one indicated by the Product Request.

Situation 6 - The holder transmitted an holder Product Header and the requester responded with an Error Message.

Situation 7 - The holder transmitted an Error Message and the requester replied with a Product Request. This could happen after a requester requests an invalid product, and gets Err10.

Situation 8 - One side transmitted an Error Message and the other side replied with an Error Message. This is a valid condition for a while . . . if it continues more than three rounds, the holder will probably send an Identification Command to reset the protocol.

Situation 9 - One side transmitted an Error Message, and the other side replies with a General Acknowledgement. This frees the errored side for the next transaction.

Situation 10 - The holder transmitted Product Data, and the requester replies with Product Acknowledgement. This presents the product checksum calculated by the requester to the holder for comparison with the value that the holder has maintained internally.

Situation 11 - The holder transmitted Product Data, and the requester replied with an Error Message, probably indicating Err9.

Situation 12 - The holder transmitted Requester Identification, which is an Err11. The requester replied with an Error Message, probably indicating either Err1 or Err11.

Situation 13 - The holder transmitted Product Request, which is an Err12. The requester replied with an Error Message, probably indicating either Err1 or Err12.

TABLE 13-continued

Situation Descriptions

Situation 14 - The holder transmitted Product Acknowledgement, which is an Err13. The requester replied with an Error Message, probably indicating either Err1 or Err13.

Situation 15 - The holder transmitted a General Acknowledgement, and the requester replied with an Error Message. This indicates some error occurred on the requester side.

Situation 16 - The requester timed out the last holder transmission; the requester sends an Error Message indicating Err7.

Situation 17 - One side transmitted a General Acknowledgement, to which the other side replied with another General Acknowledgement. This is a valid condition for a while . . . if it continues more than three rounds, the holder will probably send an Identification Command to reset the protocol.

Situation 18 - The holder transmitted a General Acknowledgement, to which the requester replied with a Product Request.

Situation 19 - The requester timed out, and the holder sent an Identification Command in an attempt to reinitialize the protocol.

Situation 20 - The requester timed out, and the holder sent an Error Message probably indicating Err2.

Situation 21 - The requester sent an Identification Command to the holder. This is not a valid requester message, so the holder replied with an Error Message, probably indicating Err3.

Situation 22 - The requester transmitted Requester Identification, and the holder replied with a General Acknowledgement. This clears the way for the requester to send Product Request.

Situation 23 - The holder may issue an Identification Command in response to any message in an attempt to reinitialize the protocol.

Situation 24 - The requester transmitted Requester Identification, and the holder responded with an Error Message, probably indicating Err8. This indicates that the holder was not able to validate the Requester Identification, or some other error occurred.

Situation 25 - The requester transmitted holder Product Header, and the holder replied with an Error Message, probably indicating Err4, since requesters cannot send a product header.

Situation 26 - The requester transmits a Product Request, and the holder replies with a holder Product Header.

Situation 27 - The requester transmitted a message it should not send, and the holder responded with Identification Command. This indicates that the holder wished to

TABLE 13-continued

Situation Descriptions

| | |
|---|---|
| | initialize the protocol. |
| Situation 28 - | The requester transmitted a Product Request and the holder responded with Error Message, probably indicating Err10. This probably indicates either an invalid product identification or an invalid originating site was in the Product Request. |
| Situation 29 - | this situation left intentionally blank. |
| Situation 30 - | this situation left intentionally blank. |
| Situation 31 - | This situation left intentionally blank. |
| Situation 32 - | the requester transmitted Product Data, which is an invalid message for a requester to send. The holder replied with Error Message, probably indicating Err6. |
| Situation 33 - | this situation intentionally left blank. |
| Situation 34 - | the requester transmitted a Product Acknowledgement, and the holder replied with an Error Message. This probably indicates Err14. The requester can not use the product they are attempting to acknowledge, since they cannot tell if the checksum adds up. |
| Situation 35 - | The requester transmitted a Product Acknowledgement, and the holder replied with General Acknowledgement. This indicates that the checksums agreed, and that the requester is free to use the transmitted product. |
| Situation 36 - | The requester transmitted General Acknowledgement, and the holder replied with Product Data. This probably indicates that the requester accepted the contents of a previous holder Product Header, and is prepared to accept the product. |
| Situation 37 - | The requester sends a General Acknowledgement, and the holder responds with an Error Message |

Copyright ©1992 by Paramax Systems Corporation, A Unisys Company

Since quality control of transmitted data products is a concern for the holder as well as any originator of the data held by the holder, the protocol enforces the use of an end-to-end 32 bit product checksum calculated in accordance with the CCITT recommendation. This checksum is maintained with each product by the holder. Following product reception, the requester must return to the holder the checksum value it has calculated for that received product. The holder will then validate the checksum, and return an acknowledgement of same to the requester. From this point, product integrity is the responsibility of the recipient. The following "C" language source code defines an algorithm for calculating the CCITT recommendation for a 32 bit check character. This algorithm uses table lookup, performing a CRC algorithm on buffers of the data at a time and then producing a CRC for the entire product. The product data can arrive at the requester not all at once, but in portions called buffers. If that is the case, then even though the method flowcharts (e.g. FIGS. 7A and 7B) show checksum calculation as a single step following product reception by the requester, for performance reasons the CRC calculation should then be performed on buffers of the data as it arrives. However, the product data sent from the holder could arrive at the requester all at once. An example of software implementing this algorithm, implemented at step 125 of FIG. 7B and step 224 of FIG. 4B, is given in the following pages.

```
/* file: bldcrctb.c */
#define CRC32_POLYNOMIAL 0xEDB88320L
void BuildCRCTable()
{   int i;
    int j;
    unsigned long crc;
    extern unsigned long CRCTable [256];
    for ( i=0; i<=255; i++ )
    {   crc=i;
        for ( j=8; j>0; j— )
        {   if ( crc & 1 )
                crc= ( crc>> 1 ) ^ CRC32_POLYNOMIAL;
            else
                crc >>= 1;
        }
        CRCTable[ i ] = crc;
    }
}
/* file: gnbufcrc.c */
/* Routine calculates the CRC for a block of data using table
lookup method */
/* It accepts an original value for the crc, and returns the
updated value. */
#define CRC32_POLYNOMIAL 0xEDB88320L
unsigned long CalculateBufferCRC(unsigned int count, unsigned
long crc,
                                  void * buffer)
{   unsigned char *p;
    unsigned long temp1;
    unsigned long temp2;
    extern unsigned long CRCTable [256 ];
    p=(unsigned char * ) buffer;
    while ( count— != 0 )
    {   temp1=(crc >> 8) & 0x00FFFFFFL;
        temp2=CRCTable[ ( (int) crc ^ *p++ ) & 0xff ]
        crc=temp1 ^ temp2;
    }
    return( crc );
}
/* file: gnchksum.c */
/* stp: 1.2.2.1 Generate_Checksum */
/* Generate checksum function. */
/* 32-bit CRC for the entire message. */
/* We precondition the CRC value with all 1's, */
/* then invert every bit after the entire message has been done. */
/* This gives us a CRC value that corresponds with the values */
/* calculated by PKZIP and ARJ. */
/* Function prototype: */
unsigned long CalculateBufferCRC(unsigned int count, unsigned
long crc,
                                  void * buffer);
#define WORD unsigned int
typedef struct
{   char * message;
    WORD  size;
} NPD;
unsigned long generate_checksum(NPD * product)
{   unsigned long crc;
    int count;
    unsigned char *buffer;
    int i;
    WORD size;
    size=product->size;
    buffer=(unsigned char *)product->message;
    crc=0xFFFFFFFFL;
    i=0;
    for ( ; ; )
    {   if ( size < 512 )
            count=size;
        else
            count=512;
        if ( count == 0 )
            break;
        crc=CalculateBufferCRC(count,crc,buffer);
        buffer+=count;
        size-=count;
    }
    return ( crc^32 0xFFFFFFFFL);
}
```

Copyright ©1992 by Paramax Systems Corporation, A Unisys Company

One embodiment of holder processing according to the present invention is illustrated in the flowchart of FIGS. 6A and 6B. At step 101, communications are initialized. Ordinarily, this process would be initiated by a requester seeking access to the database of the holder. For the communication path between holder 13 and requester 17 in FIG. 1, this would involve requester 17 utilizing DSU/CSU 29 to access DSU/CSU 25 (and thus holder 13) via PSTN 27. DSU/CSU 25 and DSU/CSU 29 can alternatively each be a modem. PSTN 21 and PSTN 27 can, of course, be the same PSTN. Once a communications link has been established between a holder and a requester, the holder at step 103 sends to the requester an IDC requiring that the requester identify itself in such a manner as to verify its right to access the holder, e.g. by using a password. At step 105, the holder reads the SID sent by the requester. At step 107 the holder determines whether that SID is valid. If the SID is not valid, then the holder at step 103 again sends an IDC to the requester. Eventually, if the requester repeatedly provides invalid SID(s) then the holder will time out and break the communication link with that requester. However, if the SID is found to be valid at step 107, then the holder will send a general acknowledgement to the requester at step 109. The holder at step 111 will then read the response by the requester to the general acknowledgement of step 109, and will thereafter react to that response in the manner shown in the last row of Table 11. At step 113, the holder determines whether the response message, sent by the requester in response to the general acknowledgement of step 109, is a product request. If the response message from the requester is found by the holder at step 113 to be a product request, then the holder at step 115 will determine whether that product request includes a valid product identification (step 115) and a valid site identification (step 117). If both of the product identification and the site identification on the product request are valid, then the holder sends to the requester a product header at step 119 (FIG. 6B). The holder thereafter at step 121 reads the response from the requester to the product header sent to the requester in step 119. At step 123, the holder determines whether that response is a general acknowledgement. If it is, then the holder sends the same requested product data to the requester at step 125. As described above, the requester should respond with a product acknowledgement message containing a checksum or other checking/fault detection code, to be used to verify accurate reception of the product data. This acknowledgement is read by the holder at step 127. At step 129, the holder compares the requester's checksum, contained in or included as part of the product acknowledgement, with the holder's checksum for that product data, previously determined and stored by the holder for that product data. If the two checksums match, then the holder returns to step 109 and sends a general acknowledgement in response. The requester's response to that general acknowledgement is then read by the holder at step 111 and is processed as described above and below. However, if the holder and requester checksums are found not to match at step 129, then the holder at step 131 sends an error message to the requester, so informing the requester. The response from the requester to that error message is read by the holder at step 111, and that response is processed in the same manner described above and below for the general acknowledgement of step 109. Should either or both of the product identification and the site identification contained in the product request message from the requester be invalid, then the holder in response sends an error message to the requester so informing the requester at step 131, and then reads any response to that error message at step 111 to be processed in accordance with Table 11. Error message 10 would be used by the holder for this purpose.

At step 123, should the response from a requester to a product header not be a general acknowledgement, this would be interpreted as a decision by the requester that it did not want to receive the product data described by that product header. The holder at step 135 then looks further at the response to the product header received by the holder at step 121 to determine whether that response is a product request. If so, then holder processing returns to steps 115 and 117 to determine whether the product ID and site ID in the new product request are valid, as described above. If, however, that step 121 response from the requester is not a product request, then the holder at step 137 determines whether that response is a terminate connection message. Also, if the response from the requester, received at step 111 by the holder, to the general acknowledgement of step 109 is determined at step 113 not to be a product request, then the holder at step 137 determines whether the message from the requester is a terminate connection message. If the holder at step 137 determines that the message is a terminate connection message, then holder processing for that requester ends until the link is again initialized (step 101). Otherwise, the holder performs error processing at step 139 in accordance with the portion of Table 11 not already addressed above. Overall, the flowchart of FIGS. 6A and 6B accomplishes the holder processing of Table 11 above.

FIGS. 7A and 7B together provide a flowchart for requester processing according to one embodiment of the present invention. At step 201, the communication link between a requester and a holder is established. The IDC sent by the holder at step 103 is received by the receiver at step 203. In response to the IDC, the requester sends its subscriber identification (SID) to the holder at step 205. If that subscriber identification is valid, then the holder will send to the requester a general acknowledgement at step 109 which is received by the requester at step 207. The requester could then send its product request, including identification of the product and its site of origin, to the holder at step 209, which is received by the holder and read at step 111. The holder should then respond with a product header at step 119, but could for example instead respond with an error message at step 131 if the product ID or the site ID requested are invalid. This response from the holder is read by the requester at step 211. At step 213, the requester determines whether this response is a product header. If so, then at steps 215 and 217 the requester determines whether the size and time of the requested product, as provided on that product header, meet the requester's acceptance criteria for size (severity) and timeliness. This determination can be performed by examining the message identifier 33 at Word 0 of the message; a product header has for example a message identifier of 131 (binary 10000011). If so, then at step 221 the requester sends a general acknowledgement to the holder, informing the holder that the requester wishes to receive the product data identified by that product header. This general acknowledgement is received by the holder at step 121. If this message is found by the holder to be a general acknowledgement (step 123),it would be responded to by the holder sending to the requester the requested product data at step 125. If not, then the requester at step 233 determines whether more products are then needed; if so, then the requester at step 219 prepares its next product request and sends that new product request to the holder at step 209. The new product request is then processed as has already been described above and is further described below. In this manner, the requester is able to examine a description of the product that it has requested before transmission of the actual product data, and so can determine whether that data is wanted. If the product does not meet the age and/or size criteria of the requester, then the requester can save connect time and resulting charges by not having an unwanted product transmitted to it by the holder. If these criteria are not met, then the requester at step 233 first determines whether it needs more products, and if so prepares its next product request at step 219. Otherwise, if the requester does not need any other product or products, then the requester processing is ended, either by transmission by the requester of a terminate connection message to the holder or else by breaking of the communication link and consequent timeout of the holder processing for that requester.

The product data, sent by the holder to the requester at step 125 of FIG. 6B in response to the general acknowledgement message from the requester sent at step 221, is received by the requester at step 223. The checksum for the product as received is then calculated as described above by the requester at step 225 so that the product acknowledgement message can be formed by the requester. That product acknowledgement message is then sent by the requester at step 227 to the holder, which reads the product acknowledgement at step 127. If the checksum on the product acknowledgement from the requester matches the checksum already calculated and stored by the holder for that product data, then the holder at step 109 sends a general acknowledgement to the requester. Otherwise, the holder sends an error message (Err14) at step 131 to the requester. In either event, this response from the holder is received by the requester at step 229. At step 231, the requester determines whether this response from the holder is a general acknowledgement. If so, then requester proceeds to step 233 to determine whether any more products are now needed. If so, then the next product request is prepared at step 219 and sent to the holder at step 209, resulting in further processing as described above and below. If no further products are needed, then the requester terminates the session, either by sending a terminate connection message to the holder or else by simply breaking or hanging up on the communication link with the holder. If at step 231, the response from the holder received at step 229 by the requester proves not to be a general acknowledgement, indicating that the holder checksum and the requester checksum did not match so that there should be an error in the product data received at step 223 from the holder, then the requester decides whether it wishes to try again at step 235. At step 235, an integer, indicating the number of data errors detected during a communication session, is incremented, and it is then determined whether that integer now exceeds a preset maximum (such as 3). The initial value of that integer would be zero. If the error threshold has not been exceeded, then requester tries to obtain that product again, and the product request is again sent at step 209. If the requester error threshold has been exceeded, then the requester does not try to obtain that product again, and requester processing proceeds to step 233 described above.

If at step 213 the holder's response to the requester's product request, received by the requester at step 211, is determined not to be a product header, then at step 241 the requester determines whether that message is an error message indicating an invalid product request. If so, then the holder at step 233 determines whether any further products are needed. If the response received by the requester at step 211 is found not to be a product header (step 213) and is found not to be an error message for an invalid product request (step 241), then at step 237 the requester determines whether the holder has provided a terminate connection message. If so, then the requester ceases processing, subject of course to re-initiation at step 201 if and as desired by the requester. If the response from the holder received by the requester at step 211 is neither a product header nor a terminate connection message, then the requester proceeds to error processing 239 in accordance with Table 12. Thus, after the requester has sent a message to the holder, the requester responds to the holder's response thereto in the manner set forth in Table 12.

Thus, steps 211, 213, 215, 217, 219, and 221 enable the requester to look at information about the product data requested to determine whether that product is sufficiently useful to that requester. The requester there considers whether the product's size and time of creation meet the requester's preset acceptance criteria. These acceptance criteria are configurable by the user who is doing the requesting. The product header or product description, provided prior to data delivery, includes the size of the product and the time of that product's creation. The requester first considers whether the product size meets the requester's acceptance criteria. If so, the requester then considers whether the time of creation meets the requester's acceptance criteria. The requester looks at the size of the radar product and at the time that the product was created, because if the product is not timely (e.g. an hour old) the requester may not want it. However, for some purposes, a user (such as a lawyer) might be interested in relatively old data for forensic purposes, i.e. to see why something happened. The size of the product varies directly with the severity of the weather. For instance, the Doppler reflectivity weather products were each running about 40,000 bytes during Hurricane Andrew and during the Blizzard of 1993. Ordinarily, thunderstorms or squall line situations might be 20,000 bytes in size. When there is no substantial weather change in progress, e.g. a blue sky situation, the products may each be only 3,000 or 4,000 bytes in size. A user may not want to pay a PSTN owner for the telephone line connect charges to transfer a 3,000 byte product that has no useful information in it for that user. With most if not all PSTNs, the longer that a connection is made, the more it costs. Thus, these steps provide the requester with a method of deciding whether the requester wants that data. The user can thereby save connect time and so reduce communication costs.

The present invention also provides assurance to the holder that the requester received the product exactly as transmitted, that the requester has performed a check for the integrity of received data, and that the requester cannot falsify the calculation for that check. If the requester does not perform this error check calculation, then normally the holder should not be held responsible for the quality of the transmitted data. This feature also provides the holder with an opportunity to determine whether the requester is using received data properly. The holder has already determined the checksum or other error checking fault detection indicator for that product. After the requester receives the product data, requester then also makes an identical such determination with the received data. However, the holder does not here transmit its fault indicator to the requester, nor lets the requester check same. Instead, the holder has the requester send the requester's fault indicator to the holder to the holder to compare with what the holder knows is correct. If the two fault indicators are the same, then the holder sends to the requester an acknowledgement that the data is good. If the two fault indicators are not the same, then the holder informs the requester that the requester's indicator is wrong; it is then left to the requester to request the product again. This method is illustrated in FIGS. 3, 5, 6B and 7B.

Error processing 139 of FIG. 6A, and error processing 239 of FIG. 7B, are both illustrated in those figures as terminal symbols. This is a terminal symbol for the error conditions; processing stops here. For such error processing, once the requisite response of Table 11 or Table 12, respectively, has been sent, processing stops until it is re-initiated. The error processing is different depending upon at what point in the method the error occurs, as shown in Table 11 and Table 12. The user can add any further error processing (beyond Tables 11 and 12) for any particular error, if desired. Any such additional error processing would be implementation—specific.

FIGS. 3, 4, and 5, and FIGS. 6 and 7 together, illustrate a dialog between holder and requester. FIGS. 6 and 7 represent two separate sides of the dialog of FIGS. 3–5, two different code implementations, and two different sides of the protocol. The present invention relies on lower layers' protocols, e.g. X.25, to handle the transfer of the data representing this dialog.

FIGS. 6A and 6B show holder processing, and FIGS. 7A and 7B show requester processing. As is also shown in FIGS. 3, 4, and 5, holder processing and requester processing take place simultaneously. This processing is half-duplex. No side sends two messages in a row. Should the holder send the requester a message, the requester would receive it, do something with it and then send back a response message to the holder which the holder then reads, and vice versa. For example, at steps 101 and 201, the holder and requester both initialize their communications, and then at step 103 the holder sends an identification command which is received by the requester at step 203. In response to that identification command, the requester at step 205 sends to the holder a subscriber identification message, which is read by the holder at step 105. At step 107, the holder determines whether that subscriber identification message is valid, indicating an authorized user. If that subscriber identification is valid, then at step 109 the holder sends a general acknowledgement message to the requester which is received by the requester at step 207. In response to that general acknowledgement, the requester at step 209 sends to the holder a product request that is received by the holder at step 111. The holder at step 113 then determines whether the response from the requester is a product request. If so, then at step 115 the holder determines whether the product identification in that product request is for an existing product. If so, then at step 117 the holder determines whether the site identification in that product request is for an existing site. If desired, the holder could instead check validity of the site identification before the holder checks validity of the product identification. If the step 111 response from the requester is found by the holder to be a product request (step 113) which has a valid product identification (step 115) and a valid site identification (step 117) then at step 119 the holder sends to the requester a product header. The product header is received and read by the requester at step 211.

At step 119, the holder sends to the requester a product header which is received by the requester at step 211. If after the checks of steps 213, 215 and 217 the requester decides that the characteristics of the requested product (e.g. size and age) are acceptable, then the requester at step 221 sends a general acknowledgement message to the holder which is received by the holder at step 121. If either side transmits a terminate connection message, then the other side's reply is undefined, since the connection communication link between holder and requester is thereupon broken. The holder at step 123 then determines from message identification field 33 whether the received message is a general acknowledgement. Alternatively, in response to the product header the requester could instead transmit to the holder a product request at step 209 instead of a general acknowledgement at step 221 to the holder, to be read by the holder at step 121. The holder at step 123 then determines that the received message is not a general acknowledgement, and at step 135 that the response is a product request. Processing by the holder thereupon proceeds to step 115 to check the product and site identifications in that product request, as described above. The holder here is first determining whether the response message is a product request. If so, then the holder examines the product identification in that product request to determine whether the requester is here asking for a valid product, and therefore determines whether the requester has sent a valid product identification and if so checks for a valid site identification.

For example, if the requester asks for product 19 from Houston, then the holder looks up in the holder's database the time of creation and the size of product 19 from Houston, and sends that information to the requester as part of the product header at step 119. This product header is then read by the requester at step 211. At step 211, the requester reads the response from the holder and at step 213 determines whether this response is a product header. If it is, then at step 215 the requester determines whether the size contained in that product header for the requested product meets the requester's preset criteria for the size the requester wants to see for that product. If it does, then at step 217 the requester determines whether the time of creation or age of this version of product 19 from Houston meets the requester's preset timeliness criteria for accepting this product. If so, then at step 221 the requester sends a general acknowledgement message to the holder thereby informing the holder that the requester wants to receive the data for this requested product. This general acknowledgement for the requester is received by the holder at step 121. At step 123, the holder determines whether message ID field 33 of the response indicates a general acknowledgement. If so, then at step 125 the holder sends the product to the requester. Meanwhile, the requester is waiting to receive the product from the holder. The requester receives the product at step 223. The requester then determines the error check indicator at step 225, and forms and sends the product acknowledgement for that product to the holder at step 227. Meanwhile, the holder is waiting to read the product acknowledgement for that product from the requester. At step 127, the holder reads the product acknowledgement from the requester, and at step 129 looks at the checksum (or other error check indicator) included with that product acknowledgement to determine whether that checksum (or other indicator) is valid. If so, then the holder at step 109 sends a general acknowledgement to the requester. The requester at step 229 receives a response (here a general acknowledgement) from the holder to the product acknowledgement, and determines at step 231 whether that response is a general acknowledgement indicating that the product was properly received by the requester. If so, then at step 233 the requester determines whether the requester needs more products. If the requester does need more products, then the requester at step 219 prepares a new product request message including another site identification and product identification. The requester then goes back up to step 209 and sends that new product request to the holder. The holder then reads this response at step 111 and at step 113 determines whether that response is a product request. If that response is found to be a product request, then at step 115 the holder determines whether the product identification included with that product request is valid. For example, the requester could now be requesting product 19 from Sterling, Va. If so, then at step 117 the holder determines whether the site identification contained in the new product request is for a valid site. For example, Sterling is a valid site. Processing then continues as is described above.

In FIG. 7A, the order of steps 215 and 217 can be exchanged. In other words, the requester could consider whether the time of creation of the product meets the requester's preset acceptance criteria for time before the requester so considers the size of the requested product.

For example, the requester sends a product request for a particular weather product from a particular geographical site at step 209, such as product 19 from Houston. The holder reads this message at step 111 and determines at step 113 that the requester has sent a request for a particular product from a particular site, here product 19 from Houston. At step 115, the holder then determines whether the product identification in that request is valid, finds that the requested product 19 is a valid product identification, and then at step 117 determines that the site identification in that product request is for an actual valid radar site, here Houston, that for which data would be in the holder's database. Meanwhile, the holder has been collecting weather image products from Houston and elsewhere, putting them in the holder's weather database, and storing them for requesters who request them. The holder then responds to the product request by sending to the requester the product header for the requested product and site, here for product 19 from Houston, which contains the size and the time of creation of that product. The holder then waits to read the response from the requester. The requester reads the response from the holder, in this case a new product header, and checks whether it is a product header at step 213. Since that response from the holder is a product header, the requester at step 215 then determines whether the product size contained in that product header meets the requester's acceptance criteria for size. For example, the requester's acceptance criteria for product 19 for Houston can be set to 7,000 bytes. If the product header provided by the holder in response to this product request shows a product size of only 3,000 bytes, that would not meet this acceptance criteria for this requester. Since the requester does not want that product, the requester then proceeds to step 233 where the requester determines if it needs more product(s). If the requester needs any more product(s), then the requester prepares its next product request at step 219 and sends it to the holder at step 209. This new product request is received by the holder at step 121. When the holder reads this response from the requester, at step 123 the holder determines whether this response is a general acknowledgement. Here, the response from the requester is not a general acknowledgement. The holder at step 135 then determines whether this response from the requester is a product request; here, that is the case. The requester has now made a request for a different product. The holder now goes to step 115 to determine whether the new product identification in the new product request is valid. If so, then the holder at step 117 determines whether the product request is for a valid site. For example, the requester may determine that, since it does not want product 19 from Houston, it would try to get product 19 from Sterling. At step 115, the holder checks whether the product identification in the product request is valid, and finds that it is so, since product 19 is a valid product identification. At step 117, the holder then checks whether the site identifier is valid. This provides to be the case, since Sterling is a valid actual existing radar site. The holder then goes to the holder's database, gets the size and time of creation of product 19 from Sterling, and sends this information in a product header over to the requester at step 119. The requester at step 211 receives this product header. At step 213, the requester checks whether this response from the holder is a product header, and finds that it is so. At step 215, the requester determines whether the size of the product meets the requester's size acceptance criteria for a product 19 from Sterling. If it does, then the requester goes to step 217 and checks whether the time of creation meets the requester's time acceptance criteria for product 19 from Sterling. If the Sterling radar site has been down for the last three hours, so that this product is three hours old, and if this requester's acceptance criteria for timeliness (for this product or in general) is not to accept anything if it is more than 15 minutes old, then the requester would here determine that it does not want this product 19 from Sterling either. Accordingly, the requester would respond to the holder's new product header not with a general acknowledgement message, but with another product request message, provided that the requester has still another product request to make. Otherwise, the requester could reply with a terminate connection message, or by breaking the communication link.

What to do in a specific error situation is defined in Tables 11 and 12 and the error messages in Table 10. These tables provide a proper response to every situation in which a holder or a requester receives and reads a message. When the nature of the received message is checked in the present method, the recipient of a message is looking to see if that message has a message identifier in field 33 that is valid for the situation the recipient is then in. The matrix of Table 11 and the matrix of Table 12 down one side has all of the possible messages and down a perpendicular side has all of the possible messages, for each situation where respectively a holder transmits and a requester replies, or a requester transmits and the holder replies. So Tables 11 and 12 uniquely identify each situation that could possibly occur, among these message types. For each example given in Tables 11 and 12, the message will be received somewhere in one of the read steps of FIGS. 6 and 7, would be processed in accordance with the steps following that read step; if the message is garbage, then eventually some error processing will result. For example, if the holder transmits a subscriber identification, that is an error, since the requester and not the holder should be transmitting a subscriber identification. Transmission of a subscriber identification message by the holder is not normal operation. The requester could validly respond to transmission by a holder of a subscriber identification by sending a terminate connection or ERRM message, but an Err1 message is preferred, which means that the holder transmitted to the requester an invalid message identification field 33. Many of the entries in Tables 11 and 12 are error conditions. However, in each case the transmission and the reception of these messages would occur in read, send or receive steps that are already in the flowcharts of FIGS. 6 and 7. There are no send and receive steps involved in these error checks that are not already in the steps of FIGS. 6 and 7. As another example, in situation 26, the requester transmits a product request, and the holder replies with a product header. As another example, in situation 7, the holder determines that a message received from the requester is a product request with an invalid product identifier, and in response the holder sends an error message and waits for another response. However, the message would still be received somewhere in one of the read steps of one of the flowcharts of FIGS. 6 and 7. For example, the message could be received at read PACK step 127, read response step 111, 121 or 229, read SID step 105, etc. The received message will be processed and, if found to be garbage, it will lead to error processing by the recipient.

The requester determines an error check/fault detection indicator such as a checksum, but does not itself do the comparison between the checksum for the original data and the checksum for the transmitted data. Instead, the requester sends the calculated checksum back to the holder that sent the requester the product, and the holder checks the checksum and then tells the requester whether the checksum is correct or not. In this manner, the present method prevents any falsification of the checksum calculation by the requester.

The apparatus and method of the present invention particularly address and apply to layers 4 and 5 of the ISO OSI model. That model, the functions of its various layers, and the desirability of conforming to it have been covered elsewhere, as discussed above. As a transport (4) and session (5) layer protocol, the present invention is suitable for use over a variety of communications media in a variety of environments. An option is also provided for dial communication.

The present invention provides apparatus and method for detecting and recording error free delivery of weather imagery information in a dynamic request/response environment. The previous situation of only one weather product being available from a radar site has now been supplanted by a new situation of multiple radar products being available from each weather radar site, and the present invention deals with that. The present invention also provides end-to-end application level integrity check on the transmitted data. The present invention also provides the capability for a receiver of data to dynamically evaluate whether to accept requested data based on one or more preselected characteristics of that data, such as size and timeliness of a weather product. The present invention satisfies the requirement for an interface to allow different customer computer systems to receive data from a single holder such as a network hub or server. The present invention also provides a mechanism for receivers of data to make real-time decisions about whether there is any "interesting" data, e.g. whether there is any "interesting" weather at the site reporting the data. Additionally, the present invention provides a solution to a problem of quality control by providing a mechanism to assure that the data product that the holder receives from the ultimate source, and the data product transmitted to and received by the customer are identical. The product level error indicator provides an end-to-end integrity check. The product error indicator logged by the holder can be compared with a corresponding error indicator determined for the product archived by the ultimate source of the data such as the National Weather Service; this capability provides an effective method of establishing the integrity of the product at both points in time. Validation of the error indicator cannot be falsified by the receiving side. The transmitting side (the holder) waits to receive the receiver determined error indicator before acknowledging it is correct. The present invention also provides a mechanism for customers to decide whether they want specific data products dynamically when the product become available, e.g. in response to a request from the customer. This dynamic is choice based on one or more characteristics of the data product, such as its size, which is transmitted as part of a product header provided to the customer before the full product is delivered. For example, the present invention allows the presence of "interesting" weather to be inferred from the size of the data product. In the case of a reflectivity or a velocity weather radar product, the larger the product, the more returns are present. A small product would contain fewer returns, indicating the lack of precipitation, clouds or similar activity. The present invention provides a mechanism to assure that the data product that the holder has received from a source for retransmission, and the product so transmitted to and received by a customer, are identical, assuring both the transmitter and the receiver of the quality of the transmitted product.

Previous radar dissemination systems required solicitation of data from different physical sources, and only allowed the acceptance of one radar product. In order to tell whether there was any relevant weather at the site, a complete product had to be received and interpreted. The present invention overcomes this difficulty by providing the size and timeliness of the product prior to the full transmission of that product to the customer. This can save communications costs by lowering the amount of data traffic required to solicit and obtain relevant weather data.

The following example illustrates a possible dial-in scenario, and equates the events occurring in that scenario to the situations defined by situation description Table 14. This scenario intentionally contains several errors in order to illustrate the use of the error messages.

TABLE 14

| Holder | Requester | Purpose | Sit # |
|---|---|---|---|
|  | initiates telephone call. Modems connect, link and packet layers are initialized. |  |  |
|  | SID, indicating username and password. | to logon to the Holder |  |
| GENACK |  | Holder validated username and password; this clears the requester to make a product request | 22 |
|  | ProdR, indicating product identification and originating site | to request transmission of the indicated product | 18 |
| ERRM, indicating Err10 |  | the requested product did not exist (for whatever reason) | 28 |
|  | ProdR, indicating product identification and originating site | requester tries again, with a different originating site/product identification combination | 7 |
| PH, indicating product identification, originating site, product size, date and time of creation |  | validates requester ProdR, and indicates the time of creation and product size so the requester can determine if it wants the product | 26 |

TABLE 14-continued

| Holder | Requester | Purpose | Sit # |
|---|---|---|---|
| | ProdR, indicating product identification and originating site | requester saw something in the previous PH that indicated it didn't really want the product; perhaps it was a very small reflectivity product, indicating no no returns worth bothering with. This ProdR asks for a different product. | 5 |
| PH, indicating product identification, originating site, product size, date and time of creation | | validates requester ProdR, and indicates the time of creation and product size so the requester can determine if it wants the product | 26 |
| | GENACK | requester indicates it wants the product | 4 |
| PD, containing the product data | | effects product transfer | 36 |
| | PACK, indicating requester calculated checksum | requester returns calculated checksum to Holder for checking | 10 |
| GENACK | | Holder indicates the requester has the correct checksum and is free to use the product | 35 |
| | ProdR, indicating product identification and originating site | requester wants another product | 18 |
| PH, indicating product identification, originating site, product size, date and time of creation | | validates requester ProdR, and indicates the time of creation and product size so the requester can determine if it wants the product | 26 |
| | GENACK | requester indicates they want the product | 4 |
| PD, containing the product data | | effects product transfer | 36 |
| | PACK, indicating requester calculated checksum | requester returns calculated checksum to Holder for checking | 10 |
| ERRM, indicating Err14 | | Holder was unable to validate the requester calculated checksum; this indicates the requester did not properly receive the product data | 34 |
| | ProdR, indicating product identification and originating site | requester tries again | 18 |
| IDC | | Holder wants the requester to identify itself | 23 |
| | SID, indicating username and password. | respond to the IDC | 1 |
| GENACK | | Holder validates the username and password. | 22 |
| | ProdR, indicating product identification and originating site | requester tries again | 18 |
| PH, indicating product identification, originating site, product size, date and time of creation | | validates requester ProdR, and indicates the time of creation and product size so the requester can determine if it wants the product | 26 |
| | GENACK | requester indicates it wants the product | |
| PD, containing the product data | | effects product transfer | 36 |
| | PACK, indicating requester calculated checksum | requester returns calculated checksum to Holder for checking | 10 |
| GENACK | | Holder indicates the requester has the correct checksum and is free to use the product | 35 |
| | TERM | requester has all the products it wants for now and terminates the connection | 3 |

Copyright ©1992 by Paramax Systems Corporation, A Unisys Company

The terms requester and subscriber are used herein interchangeably.

X.25 is particularly applicable to ISO OSI layers 2 and 3 for the communication path between holder 13 and requester 17. The communication path between holder 13 and requester 15 in FIG. 1 involves an asynchronous dial-up access. For this purpose, instead of using X.25, the present invention utilizes its own protocol for ISO OSI layers 2 and 3 for asynchronous operation. The implementation of the on-demand protocol for ISO OSI layers 4 and 5, which rides atop X.25 and LAPB, does not require additional checks on data transmission integrity other than the product checksum. There is also no data partitioning, sequence numbering or data recombination functions required for ISO OSI layers 4 and 5 since these are handled by the lower level protocols. With a low cost asynchronous interface, these lower level protocols are not present. The functions that the lower level protocol ordinarily perform must then, for this situation, be implemented within the framework of the on-demand protocol itself. At layers 4 and 5, the data message is just a long stream of product data. This stream may be 5 or 6 thousand bytes long, or it may be up 50,000 bytes long. With the asynchronous provisions of the present invention, this data stream is broken up into 256 byte segments, transmitted in sequence, each with its own checksum. These segment checksums are used in addition to the product checksum.

For asynchronous operations, the low order byte (rightmost) of each word is transmitted first. Similarly, for 32 bit entities, the low order 16 bit word is transmitted first.

Except for product data messages, the messages of the present invention are usually not large enough to require protection against corruption through data partitioning. If one of these messages becomes garbled, an error message from the other side can recover from the condition. However, the product data message could for example be 40,000 bytes in length. In order to protect against a single transmission error resulting in retransmission of an entire product, the product data message is segmented for asynchronous operation. Segment or data partitioning the message requires a sequence number to be used for recombination, a checksum specific to the message segment, and a flag to indicate when the end of the segments comprising a message has been reached. The asynchronous product data (APD) message, described below, provides these structures. The APD message implements product transmission through variable length APD segments, with the maximum APD message length being 256 bytes. The uppermost bit of APD Word 1 contains a "more data" flag, and the next 15 bits contain a sequence number which starts at zero, increments by one, and wraps (reinitializes to zero) at 32,767 (2¹⁵-1) for an individual message. The window size is one, such that there is only one outstanding APD segment at any given time. In the APD format, Words 4 and 5 are used to contain a 32 bit CCITT checksum (described above) which covers the entire APD message segment. Each segmented APD message is acknowledged by the receiving side with either a general acknowledgement (GENACK) or an error message (ERRM), indicating the successful reception, garbled reception, or timeout of each message segment. After three consecutive errors are reported for any individual segment, the product transmission is aborted. Error messages have been added to the protocol definition for the asynchronous provisions, as described in Table 18 below. The last segment of the product data is transmitted with bit 15 of APD Word 1 (Word 1 of the message header) as zero. This is the "more data" flag bit, and the zero (false) value indicates that there is no more data in the present product to follow. Following reception of the APD message with the "more data" bit set false, the receiving side will transmit a general acknowledgement message, as in situation A1 below, if the segment checksum matches. The holder would then respond with a general acknowledgement to the received general acknowledgement from the requester, as in situation 17, and the requester sends a product acknowledgement (PACK) with the complete product checksum. A preferred format for the asynchronous product data message is given in Table 15 below.

TABLE 15

Asynchronous Product Data (APD)

| Word | 111111 (bits) 5432109876543210 | Comment |
|---|---|---|
| 0 | 0000000010001001 | (137) message id |
| 1 | x | bit 15 is "more data" flag; bits 14–0 is sequence number (0–32, 767) |
| 2 | | (variable) message length in bytes |
| 3 | | |
| 4 | | 32 bit CCITT checksum |
| 5 | | |
| 6 | | asynchronous product data (variable length to 244 bytes maximum) |

Copyright ©1992 by Paramax Systems Corporation, A Unisys Company

The APD message is sent following a requester's acknowledgement to a product header, or following a general acknowledgement to a previous APD in a product sequence as in situation 36, or following an error message (ERRM) to a previously transmitted APD message as in situation A3. In APD Word 1, the "more data" flag is bit 15, and the sequence number is contained in bits 14 through 0. APD Words 2 and 3 define the message length in bytes for the length of the entire message including the header. The checksum is the same 32 bit CCITT checksum described above. The asynchronous product data begins with word 6 of Table 15. The length of asynchronous product data in bytes is the number of bytes in the product segment (maximum 244 bytes). The value of the message length field 37 of the message header of FIG. 2 for the APD message of Table 15 should equal the number of bytes in the asynchronous product segment plus 12, to a maximum of 256. An APD message can be responded to with a GENACK as in situation A1, or with an ERRM, as in situation 11.

The holder responses under asynchronous operation are given in Table 16 below. The requester responses for asynchronous operation are shown in Table 17 below.

TABLE 16

Holder Perspective

Subscriber Replies

| | | Null | IDC | SID | PH | ProdR | ERRM | APD | PACK | TERM | GENACK |
|---|---|---|---|---|---|---|---|---|---|---|---|
| Holder Transmits | Null | UD | UD | UD | UD | UD | 16 (7) | UD | UD | UD | UD |
| | IDC | Err2 | Err3 | 1 | Err4 | Err5 | 2 (3) | Err6 | Err5 | 3 | Err5 |
| | SID | Err1 | Err1 | Err1 | Err1 | Err1 | 12 (1) | Err1 | Err1 | 3 | Err1 |

TABLE 16-continued

Holder Perspective

Subscriber Replies

|  | Null | IDC | SID | PH | ProdR | ERRM | APD | PACK | TERM | GENACK |
|---|---|---|---|---|---|---|---|---|---|---|
| PH | Err2 | Err3 | Err5 | Err4 | 5 | 6 (*) | Err6 | Err5 | 3 | 4 |
| ProdR | Err1 | Err1 | Err1 | Err1 | Err1 | 13 (1) | Err1 | Err1 | 3 | Err1 |
| ERRM | Err2 | Err3 | Err5 | Err4 | 7 | 8 (*) | Err6 | Err5 | 3 | 9 |
| APD | Err2 | Err3 | Err5 | Err4 | Err5 | 11 (*) | Err6 | Err17 | 3 | A1 |
| PACK | Err1 | Err1 | Err1 | Err1 | Err1 | 14 (1) | Err1 | Err1 | 3 | Err1 |
| TERM | UD | UD | UD | UD | UD | UD | UD | UD | UD | UD |
| GENACK | Err2 | Err3 | Err5 | Err4 | 18 | 15 (*) | Err6 | A2 | 3 | 17 |

Copyright ©1992 by Paramax Systems Corporation, A Unisys Company

TABLE 17

Subscriber Perspective

Holder Replies

|  |  | Null | IDC | SID | PH | ProdR | ERRM | PD | PACK | TERM | GENACK |
|---|---|---|---|---|---|---|---|---|---|---|---|
| Subscriber Transmits | Null | UD | 19 | Err11 | UD | Err12 | 20 (2) | Err1 | Err13 | 3 | Err1 |
|  | IDC | UD | 27 | Err3 | Err3 | Err3 | 21 (3) | Err3 | Err3 | 3 | Err3 |
|  | SID | UD | 23 | Err11 | Err1 | Err12 | 24 (*) | Err1 | Err13 | 3 | 22 |
|  | PH | UD | 27 | Err4 | Err4 | Err4 | 25 (4) | Err4 | Err4 | 3 | Err4 |
|  | ProdR | UD | 23 | Err11 | 26 | Err12 | 28 (10) | Err1 | Err13 | 3 | Err1 |
|  | Errm | UD | 27 | Err11 | Err1 | Err12 | 8 (*) | Err1 | Err13 | 3 | 9 |
|  | PD | UD | 27 | Err6 | Err6 | Err6 | 32 (6) | Err6 | Err6 | 3 | Err6 |
|  | PACK | UD | 23 | Err11 | Err1 | Err12 | 34 (14) | Err1 | Err13 | 3 | 35 |
|  | TERM | UD | UD | UD | UD | UD | UD | UD | UD | UD | UD |
|  | GENACK | UD | 23 | Err11 | Err1 | Err12 | 37 (*) | 36 | Err13 | 3 | 17 |

Copyright ©1992 by Paramax Systems Corporation, A Unisys Company

In Tables 16 and 17, "UD" is undefined. A number indicates a valid situation, explained by number in Tables 13 and 19. Number (number) indicates a valid situation where the likely error reported is (number). Number (*) indicates a valid situation where the likely error reported is unknown. The error messages are those of Table 10, plus the additional error messages given in Table 18 below.

TABLE 18

Err15 - bad asynchronous product data sequence number
Err16 - bad asynchronous product data checksum
Err17 - premature Product Acknowledge in asynchronous protocol Copyright ©1992 by Paramax Systems Corporation, A Unisys Company In Tables 16 and 17, the response are identical to those seen Tables 11, 12 and 13, with the following three additions to the Situation Descriptions shown in Table 19 below.

TABLE 19

| Situation A1 | The holder transmits an asynchronous product data segment, the requester receives and validates the checksum and sequence number, and transmits GENACK. |
| Situation A2 | The requester sends PACK after receiving the GENACK acknowledging the requester's successful reception of the last segment of a product transmission. |
| Situation A3 | The requester transmits an error message in response to an asynchronous product data segment; the holder retransmits the APD. |

Copyright ©1992 by Paramax Systems Corporation, A Unisys Company

The following example session shown in Table 20 below illustrates a dial-in asynchronous scenario. For the purposes of this example, assume that the product requested is only 800 bytes long. This partitions into three 244 byte segments, with one 68 byte segment at the end with the "more data" flag bit false.

TABLE 20

| Holder | Requester | Purpose | Sit # |
|---|---|---|---|
|  | initiates telephone call. modems connect. |  |  |
|  | SID, indicating username and password | to logon to the Holder |  |
| GENACK |  | Holder validates username and password; this clears the requester to make a product request | 22 |
|  | ProdR, indicating product identification and originating site | to request transmission of the indicated product | 18 |
| PH, indicating product identification, originating site, product size, data and |  | validates requester ProdR, and indicates the time of creation and product size so the requester can | 26 |

TABLE 20-continued

| Holder | Requester | Purpose | Sit # |
|---|---|---|---|
| time of creation | | determine if it wants the product | 5 |
| | GENACK | requester indicates it wants the product | 4 |
| APD(0), with sequence number = 0, the more data bit = 1, and the message length = 256. | | Holder sends the first 244 byte block of the product in a 256 byte APD message | 36 |
| | GENACK | requester verified the APD checksum and the sequence number | A1 |
| APD(1), with sequence number = 1, the more data bit = 1, and the message length = 256. | | Holder sends the second 244 byte block of the product in a 256 byte APD message | 36 |
| | ERRM, indicating err16 | the data received by requester did not produce a checksum which agreed with that in the message header | 11 |
| APD(1), with sequence number = 1, the more data bit = 1, and the message length = 256. | | Holder retransmits the same APD message | A3 |
| | GENACK | requester verified the APD checksum and the sequence number | A1 |
| APD(2), with sequence number = 2, the more data bit = 1, and the message length = 256. | | Holder sends the third 244 byte block of the product in a 256 byte APD message | 36 |
| | GENACK | requester verified the APD checksum and the sequence number | A1 |
| APD(3), with sequence number = 3, the more data bit = 0, and the message length = 64. | | Holder sends the last 68 bytes of the product in a 80 byte APD message with the more data bit 0, or false. | 36 |
| | GENACK | requester verified the APD checksum and the sequence number | |
| GENACK | | Holder returns GENACK so that requester can send PACK | 17 |
| | PACK, indicating requester calculated checksum | requester returns calculated checksum to Holder for checking | A2 |
| GENACK | | Holder indicates the requester has the correct checksum and is free to use the product. | 35 |
| | TERM | requester ends session | 3 |

Copyright ©1992 by Paramax Systems Corporation, A Unisys Company

Figure 8B:
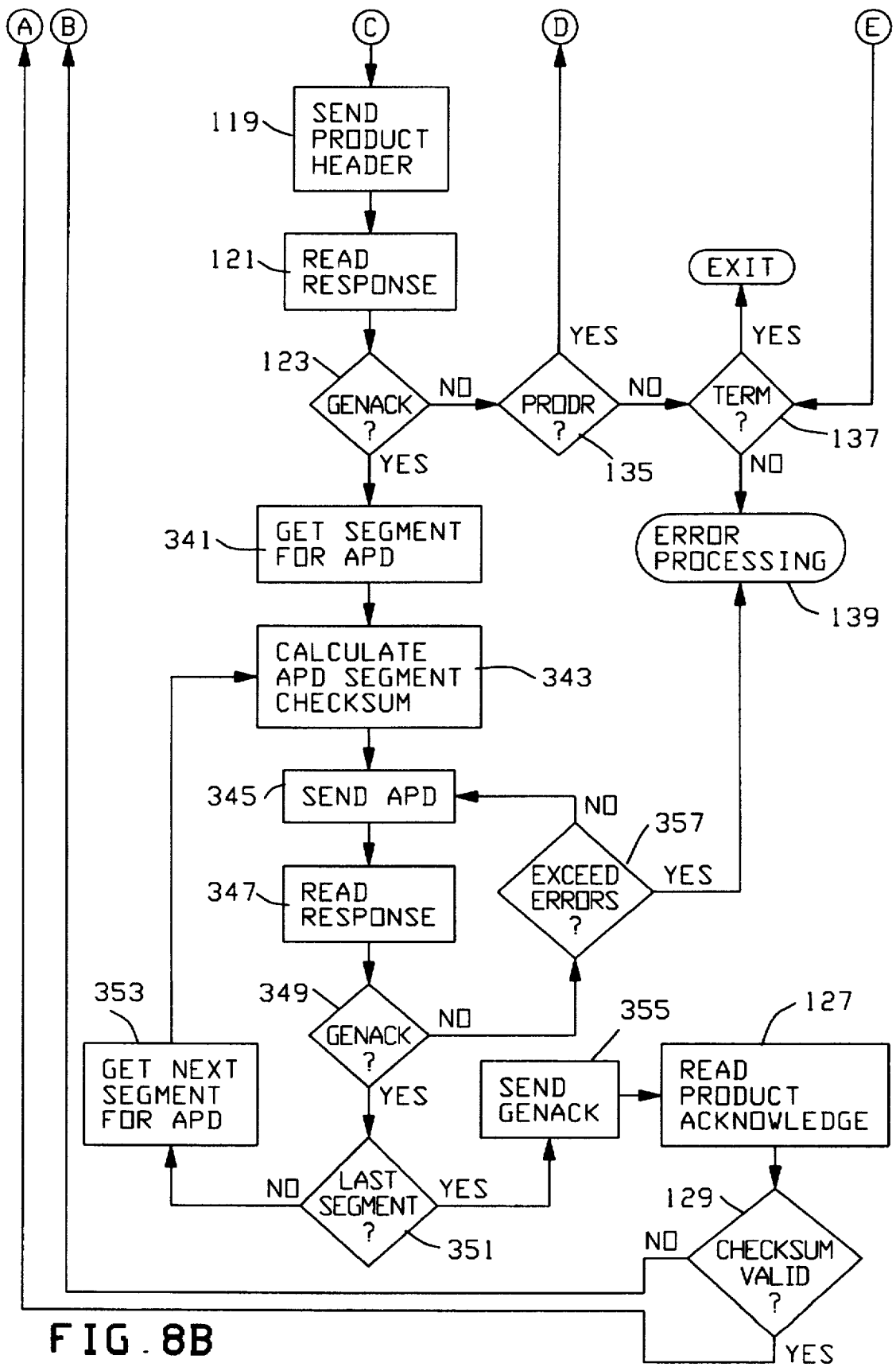
Figures 9, 9A:
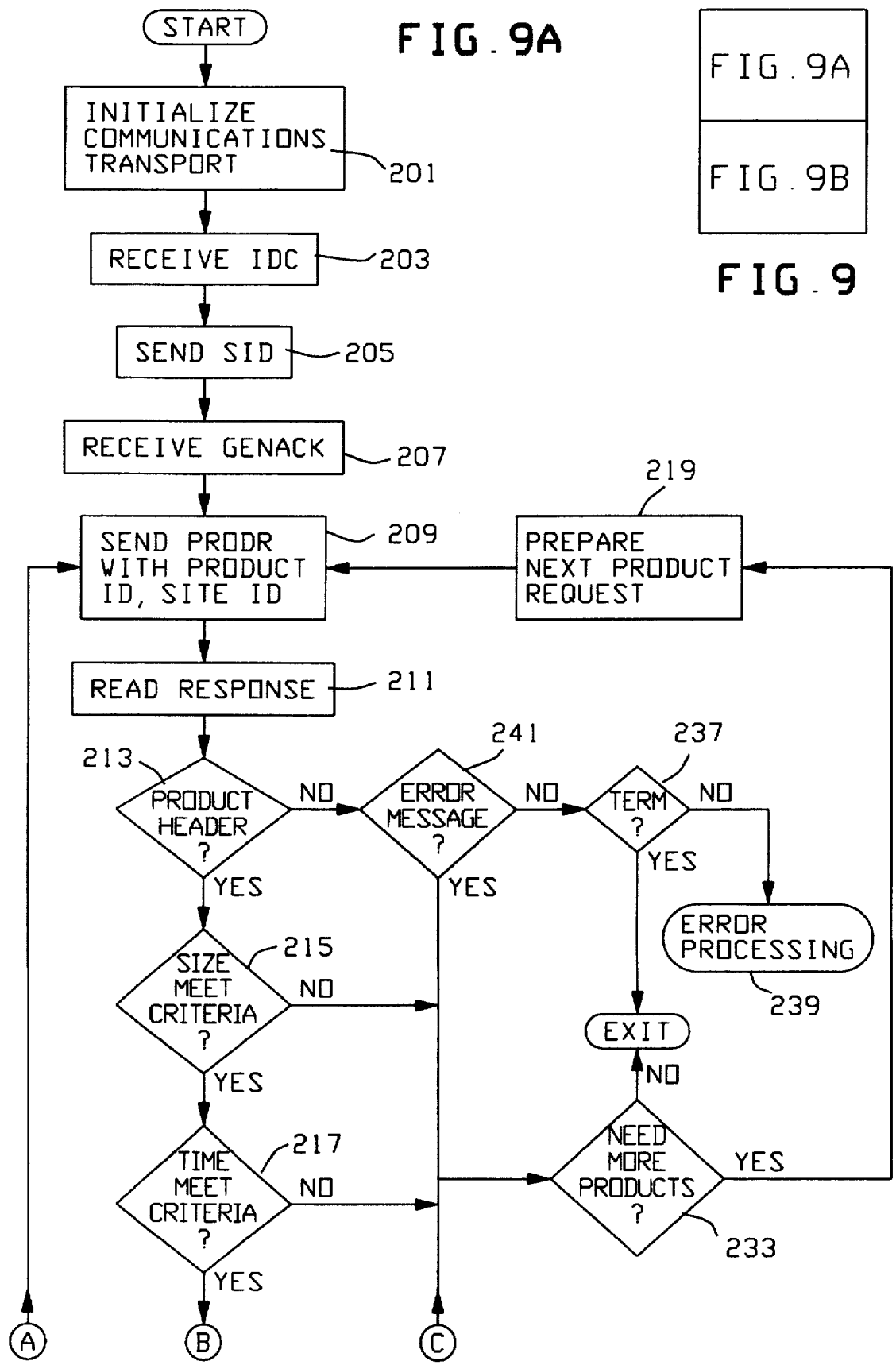
FIGS. 9A and 9B together show a flowchart of another embodiment of the processing performed in another requester of FIG. 1, arranged as shown in FIG. 9.
Figure 9B:
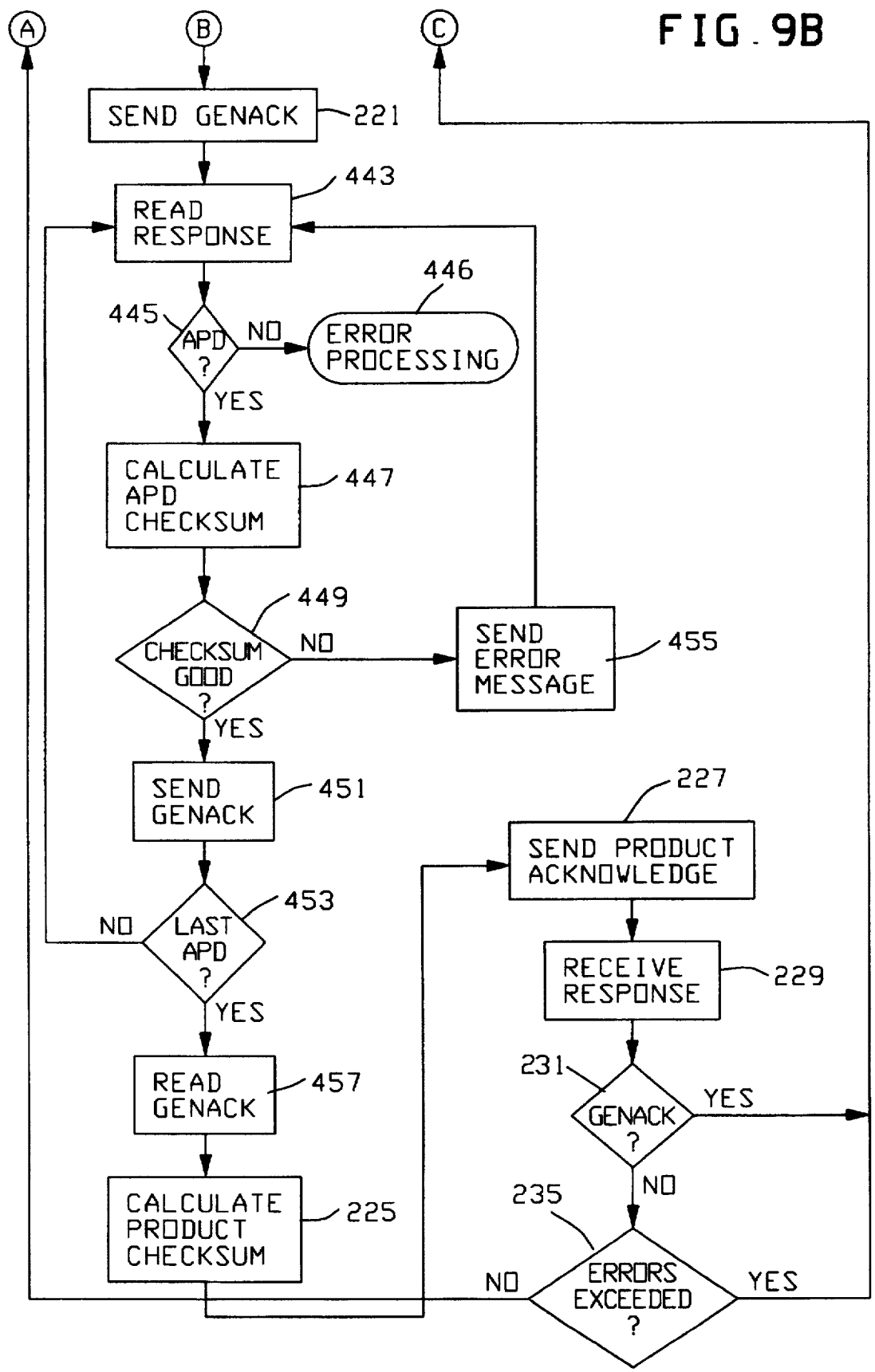

For asynchronous operation, the basic message format of FIG. 2, and the sequences of operations shown in FIGS. 3, 4 and 5, are applicable. However, holder processing and requester processing for asynchronous operation are different from the holder processing of FIG. 6 and the requester processing of FIG. 7 described above. For asynchronous operation, holder processing is illustrated by the flowchart of FIG. 8, and requester processing is illustrated by the flow chart of FIG. 9. For holder processing, the only difference between FIG. 6 and FIG. 8 are that "Send PD" step 125 of FIG. 6B is in FIG. 8 replaced with steps 341–357 for asynchronous operation. For requester processing, the only difference between FIG. 7 and FIG. 9 is that "Received Product" step 223 of FIG. 7B is replaced in FIG. 9 with steps 443 through 457 for asynchronous operation. All other steps of FIG. 8 are identical to the correspondingly named and located steps of FIG. 6, described above. All other steps of FIG. 9 are identical to the correspondingly named and located steps of FIG. 7, described above. These additional steps of FIGS. 8 and 9 will now be described in greater detail. In FIG. 8, if the holder at step 123 determines that the response by the requester to the product header sent at step 119 is a general acknowledgement message, then the holder at step 341 obtains from its database the first or initial portion of the data contained in that database for the product and site requested by the requester. The size of this initial portion, and the size of the portions provided at step 353, is one product segment, which as described above can be no greater than 244 bytes. At step 343, the holder calculates the checksum for that APD segment. At step 345, that asynchronous product data segment is sent to the requester. At step 443, the requester reads the response by the holder to the general acknowledgement (GENACK) message sent by the requester at step 221. At step 445, the requester determines whether that response message is an asynchronous product data message. If so, then at step 447 the requester determines the checksum for that data segment. Like the checksum of steps 129 and 329, the APD segment checksum is preferably a 32 bit CCITT checksum determined using the software given above. At step 449, the checksum calculated at step 447 is compared with the checksum appearing at words 4 and 5 of the APD message. If the two checksums match, then at step 451 the requester sends a general acknowledgement (GENACK) message to the holder. If the two checksums do not match, then the requester sends an error message (ERRM) to the holder at step 455, and awaits any response from the holder at step 443. Thereafter, the requester checks the "more data" flag bit of the most recent APD segment from the holder to determine whether that segment is the last segment for the requested product data (step 453). If this is the case, then the requester awaits a response from the holder at step 443, which response would be expected to be another APD segment. Otherwise, the requester at step 457 would await, and read, a response from the holder, which would be expected to be a general acknowledgement message. At step 347, the holder reads this response from the requester to the APD segment. At step 349, the holder determines whether that response is a general acknowledgement message. If so, then at step 351 the holder determines whether the most recently transmitted APD segment is the last segment of the product data requested by the requester. This determination can be made by the holder by checking the corresponding location in the holder's database. If this is not the last such segment, then at step 353 the holder obtains the next segment from the requested data, calculates the checksum for that segment at step 343, and sends the new segment at step 345, as described above. If, however, the most recently sent APD segment is the last segment for the requested product, then at step 355 the holder sends a general acknowledgement message to the requester. However, if at step 349 the holder determines that the response from the requester is not a general acknowledgement message, indicating that the last APD segment sent was erroneous, then at step 357 the holder determines whether the preset error threshold has been exceeded. This determination can be made by incrementing an integer error counter, and then determining whether the resulting integer exceeds a preset maximum number of error (such as three), as described above for step 241 of FIG. 7. If that threshold has not been exceeded, then the most recently sent APD segment is again sent at step 345. However, if that threshold has been exceeded, then error processing in accordance with Tables 16 and 17 is performed at step 139. Once that general acknowledgement from the holder has been received at step 457, the requester then calculates at step 225 the checksum for the entire transmitted product. This checksum is included in the product acknowledgement message sent to the holder by the requester at step 227. The general acknowledgement message sent by the holder at step 355 informs the requester to transmit the product acknowledgement message. The requester can determine whether the last segment has been sent from the "more data" flag bit of APD word 1, or by counting the number of bytes received for that product thus far, or (preferably) both. The holder had already provided the product size to the requester in the product header. The holder knows whether the last segment has been sent for that product because it knows the size of the product, and has divided that product into a number of segments determined by the size of the product and the permissible range of segment sizes. This product acknowledgement is received by the holder at step 127, and the overall product checksum therein is checked by the holder at step 129.

It should be understood that, although the present invention is particularly adapted to handling and communication of weather data, nonetheless the present invention can handle and communicate any sort of digital or digitized data. Also, although the 32-bit CCITT-compliant checksum described above is preferred, other error checking/fault detection codes could be utilized instead.

Some of the many advantages of the invention should now be readily apparent. For example, novel apparatus and method have been provided for providing, detecting, and recording error free delivery of data (such as but not limited to weather imagery information) in a dynamic request/ response environment. Also, novel apparatus and method have been provided for communication of data which permits the requester of such data to evaluate certain qualities or characteristics of such data, and to determine based on that evaluation whether that user needs that data, before that data is transmitted to that user. The communication can be between locations that are widely separated or nearby, and is particularly useful for relatively large blocks of data such as but not limited to weather image data. This apparatus and method is capable of verifying the accuracy or integrity of communicated (e.g. transmitted and received) data. In addition, apparatus and method have been provided for data communication capable of providing a verification that the recipient of data communicated thereby has verified the accuracy or integrity of that communicated data. Receivers of such data can therefore make an informed decision about whether the data to be provided is useful to such receiver or requester. The recipient of data is thereby able to verify the accuracy or integrity of such data. Also, the transmitter of that data can thereby receive confirmation both of the accuracy and integrity of the data, and that the receiver has so checked the received data. The exposure or liability of the transmitter of valuable data, for the reception of data which is distorted, corrupted by noise or otherwise has had its integrity interfered with by the transmission of such data, is thereby reduced or controlled. Communications costs can be reduced by lowering the amount of data traffic required to solicit and receive relevant data. Furthermore, apparatus and method have been provided which are capable of transmitting digital data from a holder of that data to a requester of that data, which apparatus and method allow for the request of specific products, and examination of a product description (e.g. product size and time of product creation) by the requester before transmission of the actual product data, and assurance or verification to the holder of the data that the requester received the product exactly as transmitted and that the requester has himself checked the accuracy or integrity of the communicated data. Apparatus and method have been provided for data communication which reduces communication cost by giving a customer the ability to refuse unwanted data, and which provides additional security to the provider of such data by ensuring both the accuracy and integrity of the data so communicated, and that the customer has himself run a check to verify the accuracy or integrity of such data.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. A method for verified communication of data from a holder of such data to a requester of such data, comprising the steps of:

determination by the holder of a respective first error checking/fault detection indicator for each of a plurality of data items stored by the holder;

identification of one of said plurality of data items by the requester to the holder;

provision of said one data item to the requester;

determination by the requester of a second error checking/ fault detection indicator, corresponding in nature to the first indicator, for said one data item;

provision, by the requester to the holder, of the second indicator;

comparison, by the holder, of the first and second indicators; and provision by the holder to the requester of a message indicating whether the first and second indicators are identical.

2. A method as defined in claim 1 wherein each of the plurality of data items comprises radar data.

3. A method as defined in claim 2 wherein said identification step comprises:

sending by the requester to the holder an identifying signal identifying the one data item by radar product type of the one data item and by radar site from which the one data item originated; and after said step of sending an identifying signal, determining whether the identifying signal identifies a valid radar product and a valid radar site, and if not then sending an error signal to the requester.

4. A method as defined in claim 1 wherein each of the plurality of data items comprises image data.

5. A method as defined in claim 1 wherein each of the plurality of data items comprises weather radar data.

6. A method as defined in claim 5 wherein said identification step comprises:

sending by the requester to the holder an identifying signal identifying the one data item by radar product type of the one data item and by radar site from which the one data item originated; and after said step of sending an identifying signal, determining whether the identifying signal identifies a valid radar product and a valid radar site, and if not then sending an error signal to the requester.

7. Apparatus for verified communication of data from a holder of such data to a requester of such data, comprising:

means for determination by the holder of a respective first error checking/fault detection indicator for each of a plurality of data items stored by the holder;

means for identification of one of said plurality of data items by the requester to the holder;

means for provision of said one data item to the requester;

means for determination by the requester of a second error checking/fault detection indicator, corresponding in nature to the first indicator, for said one data item;

means for provision, by the requester to the holder, of the second indicator;

means for comparison, by the holder, of the first and second indicators; and means for provision by the holder to the requester of a message indicating whether the first and second indicators are identical.

8. Apparatus as defined in claim 7 wherein each of the plurality of data items comprises radar data.

9. Apparatus as defined in claim 8 wherein:

said means for identification comprises means for generating an identifying signal identifying the one data item by radar product type of the one data item and by radar site from which the one data item originated; and said holder comprises means, responsive to the identifying signal, for determining whether the identifying signal identifies a valid radar product and a valid radar site, and, if not, for sending an error signal to said requester.

10. Apparatus as defined in claim 7 wherein each of the plurality of data items comprises weather radar data.

11. Apparatus as defined in claim 10 wherein:

said means for identification comprises means for generating an identifying signal identifying the one data item by radar product type of the one data item and by radar site from which the one data item originated; and said holder comprises means, responsive to the identifying signal, for determining whether the identifying signal identifies a valid radar product and a valid radar site, and, if not, for sending an error signal to said requester.

12. Apparatus as defined in claim 7 wherein each of the plurality of data items comprises image data.

13. Apparatus as defined in claim 7 wherein each of the plurality of data items comprises an image.

14. Apparatus as defined in claim 7 wherein each of the plurality of data items comprises a radar image.

15. Apparatus as defined in claim 14 wherein:

said means for identification comprises means for identification by the requester to the holder of one of said plurality of data items by radar product type of the one data item and by radar site at which the one data item originated; and said holder comprises means, responsive to said means for identification by type and site, for determining whether said means for identification by type and site has identified a valid radar product and a valid radar site, and, if not, for sending an error signal to said requester.

16. Apparatus as defined in claim 7 wherein each of the plurality of data items comprises a weather radar image.

17. Apparatus as defined in claim 16 wherein:

said means for identification comprises means for identification by the requester to the holder of one of said plurality of data items by radar product type of the one data item and by radar site at which the one data item originated; and said holder comprises means, responsive to said means for identification by type and site, for determining whether said means for identification by type and site has identified a valid radar product and a valid radar site, and, if not, for sending an error signal to said requester.

18. A method for verified selective communication of data from a holder of such data to a requester of such data, comprising the steps of:

determination by the holder of a respective first error checking/fault detection indicator for each of a plurality of data items stored by the holder;

identification of one of said plurality of data items by the requester to the holder;

provision by the holder to the requester of a message including at least one characteristic of the one data item so requested;

determination by the requester of the desirability of the requested data item based on that message;

communication by the requester to the holder of whether the requester still wants the holder to transmit the requested one data item to the requester;

provision of said one data item to the requester;

determination by the requester of a second error checking/ fault detection indicator, corresponding in nature to the first indicator, for said one data item;

provision, by the requester to the holder, of the second indicator;

comparison, by the holder, of the first and second indicators; and provision by the holder to the requester of a message indicating whether the first and second indicators are identical.

19. A method as defined in claim 18 wherein each of the plurality of data items comprises radar data.

20. A method as defined in claim 19 wherein:

said identification step comprises identifying one of said plurality of data items by radar product type of the one data item so requested and by radar site at which the one data item so requested originated; and said method further comprises the step of, after said identification step but before said message provision step, determining whether said identification step identifies a valid radar product and a valid radar site, and if not then sending an error signal to the requester instead of the message.

21. A method as defined in claim 20 wherein the at least one characteristic comprises size of the one data item and time of creation of the one data item.

22. A method as defined in claim 18 wherein each of the plurality of data items comprises weather radar data.

23. A method as defined in claim 22 wherein:

said identification step comprises identifying one of said plurality of data items by radar product type of the one data item so requested and by radar site at which the one data item so requested originated; and said method further comprises the step of, after said identification step but before said message provision step, determining whether said identification step identifies a valid radar product and a valid radar site, and if not then sending an error signal to the requester instead of the message.

24. A method as defined in claim 23 wherein the at least one characteristic comprises size of the one data item and time of creation of the one data item.

25. A method as defined in claim 18 wherein each of the plurality of data items comprises image data.

26. A method as defined in claim 25 wherein the at least one characteristic comprises size of the one data item and time of creation of the one data item.

27. A method as defined in claim 18 wherein the at least one characteristic comprises size of the one data item and time of creation of the one data item.

* * * * *